United States Patent
Geng et al.

(10) Patent No.: US 12,160,361 B2
(45) Date of Patent: Dec. 3, 2024

(54) PACKET TRANSMISSION METHOD, APPARATUS, AND DEVICE

(71) Applicant: HUAWEI TECHNOLOGIES CO., LTD., Guangdong (CN)

(72) Inventors: Xuesong Geng, Beijing (CN); Zhenbin Li, Beijing (CN); Jingrong Xie, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/495,897

(22) Filed: Oct. 27, 2023

(65) Prior Publication Data

US 2024/0056383 A1 Feb. 15, 2024

Related U.S. Application Data

(63) Continuation of application No. PCT/CN2022/070821, filed on Jan. 7, 2022.

(30) Foreign Application Priority Data

Apr. 30, 2021 (CN) .......................... 202110485917.5

(51) Int. Cl.
  *H04L 45/17* (2022.01)
  *H04L 45/00* (2022.01)
  *H04L 45/74* (2022.01)
(52) U.S. Cl.
  CPC ............ *H04L 45/17* (2022.05); *H04L 45/566* (2013.01); *H04L 45/74* (2013.01)
(58) Field of Classification Search
  CPC ........ H04L 45/17; H04L 45/566; H04L 45/74
  See application file for complete search history.

(56) References Cited

U.S. PATENT DOCUMENTS

| | | | | |
|---|---|---|---|---|
| 2015/0131659 | A1* | 5/2015 | Wijnands | ................ H04L 45/16 370/392 |
| 2017/0126481 | A1* | 5/2017 | Pignataro | ................ H04L 45/22 |
| 2020/0329111 | A1* | 10/2020 | Ren | .......................... H04L 67/12 |
| 2021/0119921 | A1* | 4/2021 | Xie | .......................... H04L 45/24 |

OTHER PUBLICATIONS

Merling et al., "Comparison of Fast-ReRoute Mechanisms for BIER-Based IP Multicast", 2020 Seventh International Conference on Software Defined Systems, Jul. 17, 2020.*

Fernandez-Del-Carpio et al., "Forwarding of mutlicast packets with hybrid methods based on Bloom Filters and shared trees in MPLS networks", 2017 IEEE 18th Intenational Conference on High Performance Switching and Routing, Jun. 1, 2017.*

* cited by examiner

*Primary Examiner* — Todd L Barker

(57) ABSTRACT

This application provides a packet transmission method, apparatus, and device. For example, the method is performed by an ingress node. The ingress node obtains a second packet by using first node information carried in a first packet, where the first node information includes a first bit string indicating N next-hop devices of the ingress node and first reference information used for indexing second node information corresponding to a first intermediate node in the N next-hop devices, and the second packet includes a first identifier determined based on the first reference information. The ingress node sends the second packet to the first intermediate node. Because structures of the first bit string and the first reference information are used, a packet encoding manner is simple, so that packet transmission efficiency is improved.

20 Claims, 11 Drawing Sheets

|   |   |   | Segment left (segment left) |
|---|---|---|---|
| A | 1 | 110000 | 0 |
| B | 0 | 111000 | 1 |
| C | 0 | 111000 | 2 |

FIG. 7

| Offset (offset) | Octet (octet) | | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|---|
| Octet (octet) | Bit (bit) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Version (version) | | | | Traffic class (traffic class) | | | | | | | | Flow label (flow label) | | | | | | | | | | | | | | | | | | | | |
| 4 | 32 | Payload length (payload length) | | | | | | | | | | | | | | | Next header (next header) | | | | | | | | Hop limit (hop limit) | | | | | | | | |
| 8 | 64 | Source address (source address) | | | | | | | | | | | | | | | | | | | | | | | | | | | | | | | |
| 12 | 96 | | | | | | | | | | | | | | | | | | | | | | | | | | | | | | | | |
| 16 | 128 | | | | | | | | | | | | | | | | | | | | | | | | | | | | | | | | |
| 20 | 160 | | | | | | | | | | | | | | | | | | | | | | | | | | | | | | | | |
| 24 | 192 | Destination address (destination address) | | | | | | | | | | | | | | | | | | | | | | | | | | | | | | | |
| 28 | 224 | | | | | | | | | | | | | | | | | | | | | | | | | | | | | | | | |
| 32 | 256 | | | | | | | | | | | | | | | | | | | | | | | | | | | | | | | | |
| 36 | 288 | | | | | | | | | | | | | | | | | | | | | | | | | | | | | | | | |

FIG. 8

| Offset (offset) | Octet (octet) | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Octet (octet) | Bit (bit) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Next header (next header) | | | | | | | | Header extension length (Hdr Ext Len) | | | | | | | | Routing type (routing type) | | | | | | | | Segments left (segments left) | | | | | | | |
| 4 | 32 | Type-specific data (type-specific data) | | | | | | | | | | | | | | | | | | | | | | | | | | | | | | | |
| 8 | 64 | Optional: more type-specific data (optional: more type-specific data....) | | | | | | | | | | | | | | | | | | | | | | | | | | | | | | | |
| 12 | 96 | | | | | | | | | | | | | | | | | | | | | | | | | | | | | | | | |

FIG. 9

| Next header (next header) | Header extension length (Hdr Ext Len) | Routing type (routing type=4) | Segments left (segments left) |
|---|---|---|---|
| Bitstring type (bitstring type) | Segment length (segment length) | Reserved (reserved) | |
| Segment (segment) [0] | | | |
| Segment (segment) [1] | | | |
| ... | | | |
| Segment (segment) [n] | | | |

| Bit position identifier (bit position) | Port (adjacency) | Next-hop address (address) |
|---|---|---|

| Bit position identifier (bit position) | Port (adjacency) | Next-hop address (address) |
|---|---|---|
| 1 | Outbound interface (interface) 1 | B |
| 2 | Outbound interface (interface) 2 | C |
| 3 | Outbound interface (interface) 3 | D |
| ... | ... | ... |

FIG. 13

| Bit position identifier (bit position) | Port (adjacency) | Next-hop address (address) |
|---|---|---|
| 1 | Outbound interface (interface) 1 | B1 |
| 2 | Outbound interface (interface) 2 | B2 |
| 3 | Outbound interface (interface) 3 | B3 |
| ... | ... | ... |

FIG. 14

| Bit position identifier (bit position) | Port (adjacency) | Next-hop address (address) |
|---|---|---|
| 1 | Outbound interface (interface) 1 | C1 |
| 2 | Outbound interface (interface) 2 | C2 |
| 3 | Outbound interface (interface) 3 | C3 |
| ... | ... | ... |

PACKET TRANSMISSION METHOD, APPARATUS, AND DEVICE

CROSS-REFERENCE TO RELATED APPLICATIONS

This application is a continuation of International Application No. PCT/CN2022/070821, filed on Jan. 7, 2022, which claims priority to Chinese Patent Application No. 202110485917.5, filed on Apr. 30, 2021. The disclosures of the aforementioned applications are hereby incorporated by reference in their entireties.

TECHNICAL FIELD

This application relates to the field of communication technologies, and in particular, to a packet transmission method, apparatus, and device.

BACKGROUND

With development of communication technologies, a packet is transmitted between communication devices in more manners. For example, a packet is transmitted in a scenario of the segment routing over internet protocol version 6 (SRv6). A segment routing header (SRH) is inserted into an internet protocol version 6 (IPv6) packet for an SRv6 packet, and a segment list including segment identifiers (SIDs) in the SRH is used for packet transmission on a packet transmission path. A quantity of forks and a quantity of sub-tree segment identifiers of a multicast tree are defined in the SID, and an SID corresponding to a packet replication node and an SID corresponding to a node in a sub-tree after the node are arranged together for nested encoding, so as to form the segment list. During packet transmission, a quantity of packet replications is first determined based on the quantity of forks of the multicast tree, and the packets are replicated based on the quantity of packet replications. Then, an SID of a next-hop packet replication node and an SID corresponding to a node in a sub-tree after the next-hop packet replication node are positioned in the segment list by using the quantity of forks and the quantity of sub-tree segment identifiers of the multicast tree, an SID of another node and an SID of a sub-tree of the another node in the replicated packet are removed, and finally the processed packet is transmitted to the next-hop packet replication node. Because nested encoding is required for the segment list provided in the method, a complex encoding structure is caused, and each replication node needs to process the segment list after packet replication. When a replication node has a large quantity of next-hop replication nodes, packet transmission overheads are excessively high, and transmission efficiency is excessively low.

SUMMARY

This application provides a packet transmission method, apparatus, and device, to reduce overheads in a packet transmission process and improve transmission efficiency.

According to a first aspect, a packet transmission method is provided. The method includes: An ingress node obtains a first packet, where the first packet includes first node information, the first node information includes a first bit string and first reference information, the first bit string indicates N next-hop devices of the ingress node, N is an integer greater than or equal to 1, and the first reference information is used for indexing second node information corresponding to a first intermediate node in the N next-hop devices; the ingress node obtains a second packet based on the first node information, where the second packet includes a first identifier determined based on the first reference information; and the ingress node sends the second packet to the first intermediate node.

The device may quickly determine a next-hop packet processing device by using the first bit string and the first reference information that are in the first node information and that are carried in the packet, obtain the second packet based on node information of the next-hop device, and then transmit the second packet to the next-hop device, so that a packet transmission process is simple and efficient. In addition, the first node information includes structures of the first bit string and the first reference information, so that a packet encoding manner is simple, and packet processing efficiency and packet transmission efficiency of the device are also improved.

In a possible implementation, that the ingress node obtains a second packet based on the first node information includes: The ingress node obtains a first forwarding entry based on the first bit string included in the first node information, where the first forwarding entry includes a bit position and next-hop information, the bit position included in the first forwarding entry corresponds to a first bit in the first bit string, the first bit corresponds to the first intermediate node, and the next-hop information included in the first forwarding entry corresponds to the first intermediate node; the ingress node replicates the first packet based on the first forwarding entry; and the ingress node obtains the second packet based on a replicated first packet and the first reference information included in the first node information.

In a possible implementation, that the ingress node sends the second packet to the first intermediate node includes: The ingress node sends the second packet to the first intermediate node based on the next-hop information included in the first forwarding entry, where the next-hop information included in the first forwarding entry includes one or more of a port communicating with the first intermediate node and an address of the first intermediate node.

The ingress node can efficiently and accurately determine the next-hop information by using the first forwarding entry, and transmit the packet to the next hop.

In a possible implementation, the second packet further includes second node information, the second node information includes a second bit string and second reference information, the second bit string indicates M next-hop devices of the first intermediate node, M is an integer greater than or equal to 1, and the second reference information is used for indexing third node information corresponding to a second intermediate node in the M next-hop devices; the second packet further includes second node information, the second node information includes a second bit string and second reference information, the second bit string indicates M next-hop devices of the first intermediate node, M is an integer greater than or equal to 1, and the second reference information indicates that the first intermediate node is a previous hop of an egress node; or the second packet further includes second node information, the second node information includes a second bit string and second reference information, the second bit string indicates M next-hop devices of the first intermediate node, M is an integer greater than or equal to 1, and the second reference information indicates to pop up the first node information and the second node information.

In a possible implementation, if N is 1, a value of the first identifier is a value carried in the first reference information;

or if N is an integer greater than 1, a value of the first identifier is a value carried in the first reference information, or the value of the first identifier is a sum of the value carried in the first reference information and an offset.

The first identifier is determined as indicated by the first reference information, so that the second node information can be quickly positioned. Therefore, the packet processing efficiency is improved.

In a possible implementation, the method further includes: The ingress node obtains the bit position corresponding to the first intermediate node and the next-hop information corresponding to the first intermediate node; and the ingress node obtains the first forwarding entry based on the bit position corresponding to the first intermediate node and the next-hop information corresponding to the first intermediate node; or the method further includes: The ingress node receives the first forwarding entry sent by a control device.

In a possible implementation, the first packet is an internet protocol version 6 IPv6 packet, the IPv6 packet includes a routing header RH, and the RH includes the first node information.

In an IPv6 network, the packet transmission method provided in this application can be used for improving network scalability and a network transmission speed.

According to a second aspect, a packet transmission method is provided. The method includes: A first intermediate node receives a first packet, where the first packet includes a first identifier and first node information, the first identifier is used for indexing the first node information, the first node information includes a first bit string, the first bit string indicates M next-hop devices of the first intermediate node, and M is an integer greater than or equal to 1; the first intermediate node obtains a second packet based on the first node information determined by using the first identifier; and the first intermediate node sends the second packet to a next hop that is in the M next-hop devices and that is used for processing the second packet.

The device may quickly determine the next-hop packet processing device by using the first bit string and first reference information that are in the first node information and that are carried in the packet, obtain the second packet based on node information of the next-hop device, and then transmit the second packet to the next-hop device, so that a packet transmission process is simple and efficient. In addition, the first node information includes structures of the first bit string and the first reference information, so that a packet encoding manner is simple, and packet processing efficiency and packet transmission efficiency of the device are also improved.

In a possible implementation, the next hop used for processing the second packet is a second intermediate node, the first packet further includes second node information and the first reference information, the first reference information is used for indexing the second node information, and that the first intermediate node obtains a second packet based on the first node information determined by using the first identifier includes: The first intermediate node obtains the first node information from the first packet based on the first identifier; the first intermediate node obtains a first forwarding entry based on the first bit string included in the first node information, where the first forwarding entry includes a bit position and next-hop information, the bit position included in the first forwarding entry corresponds to a first bit in the first bit string, the first bit corresponds to the second intermediate node, and the next-hop information included in the first forwarding entry corresponds to the second intermediate node; the first intermediate node replicates the first packet based on the first forwarding entry; and the first intermediate node obtains the second packet based on a replicated first packet and the first reference information included in the first node information, where the second packet includes a second identifier, and the second identifier is a value determined based on the first reference information.

The first identifier is determined as indicated by the first reference information, so that the second node information can be quickly positioned. Therefore, the packet processing efficiency is improved.

In a possible implementation, that the first intermediate node sends the second packet to a next hop that is in the M next-hop devices and that is used for processing the second packet includes: The first intermediate node sends the second packet to the second intermediate node based on the next-hop information included in the first forwarding entry, where the next-hop information included in the first forwarding entry includes one or more of a port communicating with the second intermediate node and an address of the second intermediate node.

The ingress node can efficiently and accurately determine the next-hop information by using the first forwarding entry, and transmit the packet to the next hop.

In a possible implementation, the next hop used for processing the second packet is an egress node, the first packet further includes first reference information, the first reference information indicates that the first intermediate node is a previous hop of the egress node, and that the first intermediate node obtains a second packet based on the first node information determined by using the first identifier includes: The first intermediate node obtains the first node information from the first packet based on the first identifier; the first intermediate node obtains a first forwarding entry based on the first bit string included in the first node information, where the first forwarding entry includes a bit position and next-hop information, the bit position included in the first forwarding entry corresponds to a first bit in the first bit string, the first bit corresponds to a second intermediate node, and the next-hop information included in the first forwarding entry corresponds to the second intermediate node; the first intermediate node replicates the first packet based on the first forwarding entry; and the first intermediate node obtains the second packet based on a replicated first packet and the first reference information included in the first node information.

In a possible implementation, the second packet includes a second identifier, and a value of the second identifier is a value determined based on the first reference information; or the second packet does not include the first node information or the first identifier.

In a possible implementation, that the first intermediate node sends the second packet to a next hop that is in the M next-hop devices and that is used for processing the second packet includes: The first intermediate node sends the second packet to the egress node based on the next-hop information included in the first forwarding entry, where the next-hop information included in the first forwarding entry includes one or more of a port communicating with the egress node and an address of the egress node.

In a possible implementation, if M is 1, a value of the second identifier is a value carried in the first reference information; or if M is an integer greater than 1, a value of the second identifier of the second packet is a value carried in the first reference information, or the value of the second identifier of the second packet is a sum of the value carried in the first reference information and an offset.

In a possible implementation, the method further includes: The first intermediate node obtains the bit position corresponding to the next hop used for processing the second packet and the next-hop information corresponding to the next hop used for processing the second packet; and the first intermediate node obtains the first forwarding entry based on the bit position corresponding to the next hop used for processing the second packet and the next-hop information corresponding to the next hop used for processing the second packet; or the method further includes: The first intermediate node receives the first forwarding entry sent by a control device.

In a possible implementation, the first packet is an internet protocol version 6 IPv6 packet, the IPv6 packet includes a routing header RH, and the RH includes the first identifier and first node information.

In an IPv6 network, the packet transmission method provided in this application can be used for improving network scalability and a network transmission speed.

According to the methods provided in the first aspect and the second aspect, the device may quickly determine the next-hop packet processing device by using the first bit string and the first reference information that are in the first node information and that are carried in the packet, obtain the second packet based on the node information of the next-hop device, and then transmit the second packet to the next-hop device, so that the packet transmission process is simple and efficient. In addition, the first node information includes the structures of the first bit string and the first reference information, so that the packet encoding manner is simple, and the packet processing efficiency and the packet transmission efficiency of the device are also improved.

According to a third aspect, a packet transmission apparatus is provided. The apparatus includes a first obtaining module, a second obtaining module, and a sending module.

The apparatus is used in an ingress node. In this case, the first obtaining module is configured to obtain a first packet, where the first packet includes first node information, the first node information includes a first bit string and first reference information, the first bit string indicates N next-hop devices of the ingress node, N is an integer greater than or equal to 1, and the first reference information is used for indexing second node information corresponding to a first intermediate node in the N next-hop devices; the second obtaining module is configured to obtain a second packet based on the first node information, where the second packet includes a first identifier determined based on the first reference information; and the sending module is configured to send the second packet to the first intermediate node.

In a possible implementation, the second obtaining module is configured to: obtain a first forwarding entry based on the first bit string included in the first node information, where the first forwarding entry includes a bit position and next-hop information, the bit position included in the first forwarding entry corresponds to a first bit in the first bit string, the first bit corresponds to the first intermediate node, and the next-hop information included in the first forwarding entry corresponds to the first intermediate node; replicate the first packet based on the first forwarding entry; and obtain the second packet based on a replicated first packet and the first reference information included in the first node information.

In a possible implementation, the sending module is configured to send the second packet to the first intermediate node based on the next-hop information included in the first forwarding entry, where the next-hop information included in the first forwarding entry includes one or more of a port communicating with the first intermediate node and an address of the first intermediate node.

In a possible implementation, the second packet further includes second node information, the second node information includes a second bit string and second reference information, the second bit string indicates M next-hop devices of the first intermediate node, M is an integer greater than or equal to 1, and the second reference information is used for indexing third node information corresponding to a second intermediate node in the M next-hop devices; the second packet further includes second node information, the second node information includes a second bit string and second reference information, the second bit string indicates M next-hop devices of the first intermediate node, M is an integer greater than or equal to 1, and the second reference information indicates that the first intermediate node is a previous hop of an egress node; or the second packet further includes second node information, the second node information includes a second bit string and second reference information, the second bit string indicates M next-hop devices of the first intermediate node, M is an integer greater than or equal to 1, and the second reference information indicates to pop up the first node information and the second node information.

In a possible implementation, if N is 1, a value of the first identifier is a value carried in the first reference information; or if N is an integer greater than 1, a value of the first identifier is a value carried in the first reference information, or the value of the first identifier is a sum of the value carried in the first reference information and an offset.

In a possible implementation, the first obtaining module is further configured to: obtain the bit position corresponding to the first intermediate node and the next-hop information corresponding to the first intermediate node; and obtain the first forwarding entry based on the bit position corresponding to the first intermediate node and the next-hop information corresponding to the first intermediate node; or the first obtaining module is further configured to receive the first forwarding entry sent by a control device.

In a possible implementation, the first packet is an internet protocol version 6 IPv6 packet, the IPv6 packet includes a routing header RH, and the RH includes the first node information.

The apparatus is used in a first intermediate node. In this case, the first obtaining module is configured to receive a first packet, where the first packet includes a first identifier and first node information, the first identifier is used for indexing the first node information, the first node information includes a first bit string, the first bit string indicates M next-hop devices of the first intermediate node, and M is an integer greater than or equal to 1; the second obtaining module is configured to obtain a second packet based on the first node information determined by using the first identifier; and the sending module is configured to send the second packet to a next hop that is in the M next-hop devices and that is used for processing the second packet.

In a possible implementation, the next hop used for processing the second packet is a second intermediate node, the first packet further includes second node information and first reference information, the first reference information is used for indexing the second node information, and the second obtaining module is configured to: obtain the first node information from the first packet based on the first identifier; obtain a first forwarding entry based on the first bit string included in the first node information, where the first forwarding entry includes a bit position and next-hop information, the bit position included in the first forwarding entry corresponds to a first bit in the first bit string, the first bit corresponds to the second intermediate node, and the next-hop information included in the first forwarding entry corresponds to the second intermediate node; replicate the first packet based on the first forwarding entry; and obtain the second packet based on a replicated first packet and the first reference information included in the first node information, where the second packet includes a second identifier, and the second identifier is a value determined based on the first reference information.

In a possible implementation, the sending module is configured to send the second packet to the second intermediate node based on the next-hop information included in the first forwarding entry, where the next-hop information included in the first forwarding entry includes one or more of a port communicating with the second intermediate node and an address of the second intermediate node.

In a possible implementation, the next hop used for processing the second packet is an egress node, the first packet further includes first reference information, the first reference information indicates that the first intermediate node is a previous hop of the egress node, and the second obtaining module is configured to: obtain the first node information from the first packet based on the first identifier; obtain a first forwarding entry based on the first bit string included in the first node information, where the first forwarding entry includes a bit position and next-hop information, the bit position included in the first forwarding entry corresponds to a first bit in the first bit string, the first bit corresponds to a second intermediate node, and the next-hop information included in the first forwarding entry corresponds to the second intermediate node; replicate the first packet based on the first forwarding entry; and obtain the second packet based on a replicated first packet and the first reference information included in the first node information.

In a possible implementation, the second packet includes a second identifier, and a value of the second identifier is a value determined based on the first reference information; or the second packet does not include the first node information or the first identifier.

In a possible implementation, the sending module is configured to send the second packet to the egress node based on the next-hop information included in the first forwarding entry, where the next-hop information included in the first forwarding entry includes one or more of a port communicating with the egress node and an address of the egress node.

In a possible implementation, if M is 1, a value of the second identifier is a value carried in the first reference information; or if M is an integer greater than 1, a value of the second identifier of the second packet is a value carried in the first reference information, or the value of the second identifier of the second packet is a sum of the value carried in the first reference information and an offset.

In a possible implementation, the first obtaining module is further configured to: obtain the bit position corresponding to the next hop used for processing the second packet and the next-hop information corresponding to the next hop used for processing the second packet; and obtain the first forwarding entry based on the bit position corresponding to the next hop used for processing the second packet and the next-hop information corresponding to the next hop used for processing the second packet; or the first obtaining module is further configured to receive the first forwarding entry sent by a control device.

In a possible implementation, the first packet is an IPv6 packet, the IPv6 packet includes a routing header RH, and the RH includes the first identifier and the first node information.

According to a fourth aspect, a packet transmission device is provided. The packet transmission device includes a processor, the processor is coupled to a memory, the memory stores at least one instruction, and the at least one instruction is loaded and executed by the processor, so that the packet transmission device implements the packet transmission method according to either of the first aspect and the second aspect, or any possible implementation of either of the first aspect and the second aspect.

According to a fifth aspect, a computer-readable storage medium is provided. The computer-readable storage medium stores at least one instruction, and the instruction is loaded and executed by a processor, so that a computer implements the packet transmission method according to either of the first aspect and the second aspect, or any possible implementation of either of the first aspect and the second aspect.

According to a sixth aspect, a computer program product is provided. The computer program product includes a computer program or code. When the computer program or the code is executed by a computer, the packet transmission method according to either of the first aspect and the second aspect, or any possible implementation of either of the first aspect and the second aspect is implemented.

According to a seventh aspect, a communication apparatus is provided. The apparatus includes a transceiver, a memory, and a processor. The transceiver, the memory, and the processor communicate with each other through an internal connection path. The memory is configured to store instructions. The processor is configured to execute the instructions stored in the memory, to control the transceiver to receive a signal, and control the transceiver to send a signal. In addition, when the processor executes the instructions stored in the memory, the processor is enabled to perform the method according to either of the first aspect and the second aspect, or any possible implementation of either of the first aspect and the second aspect.

In an example embodiment, there are one or more processors, and there are one or more memories.

In an example embodiment, the memory may be integrated with the processor, or the memory and the processor are disposed separately.

In a specific implementation process, the memory may be a non-transitory memory, such as a read-only memory (ROM). The memory and the processor may be integrated into one chip, or may be separately disposed in different chips. A type of the memory and a manner in which the memory and the processor are disposed are not limited in this embodiment of this application.

According to an eighth aspect, a chip is provided. The chip includes a processor, configured to invoke instructions from a memory and run the instructions stored in the memory, so that a communication device in which the chip is installed performs the packet transmission method according to either of the first aspect and the second aspect, or any possible implementation of either of the first aspect and the second aspect.

According to a ninth aspect, another chip is provided. The chip includes an input interface, an output interface, a processor, and a memory. The input interface, the output interface, the processor, and the memory are connected through an internal connection path. The processor is configured to execute code in the memory. When the code is executed, the processor is configured to perform the packet transmission method according to either of the first aspect and the second aspect, or any possible implementation of either of the first aspect and the second aspect.

According to a tenth aspect, a packet transmission system is provided. The packet transmission system includes an ingress node and a first intermediate node, the ingress node performs the packet transmission method according to any one of the first aspect or the possible implementations of the first aspect, the first intermediate node performs the packet transmission method according to any one of the second aspect or the possible implementations of the second aspect, and the first intermediate node receives a second packet sent by a first device.

BRIEF DESCRIPTION OF DRAWINGS

FIG. 7 is a schematic diagram of a structure of a node information list according to an embodiment of this application;

FIG. 8 is a schematic diagram of a structure of an IPv6 packet header according to an embodiment of this application;

FIG. 9 is a schematic diagram of a structure of an RH header according to an embodiment of this application;

FIG. 13 is a schematic diagram of a structure of a forwarding table according to an embodiment of this application;

FIG. 14 is a schematic diagram of a structure of a forwarding table according to an embodiment of this application;

DESCRIPTION OF EMBODIMENTS

The following further describes in detail embodiments of this application with reference to accompanying drawings.

Figure 1:
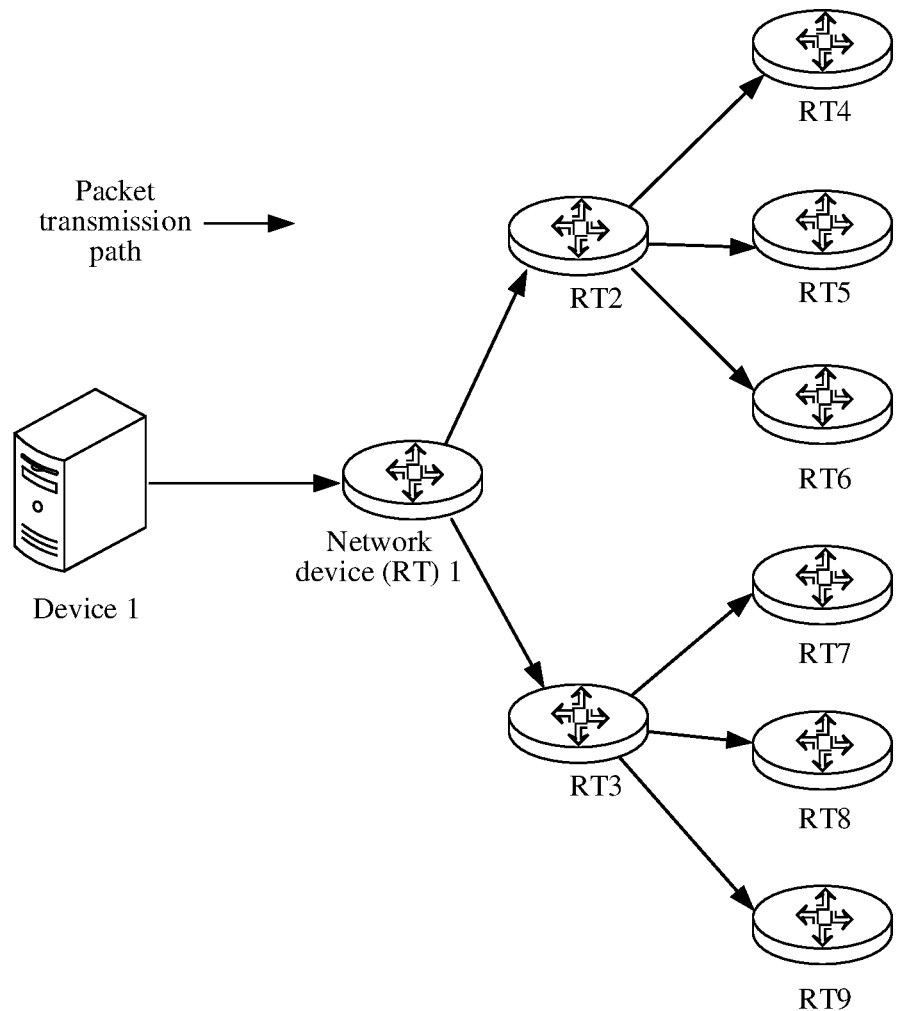
FIG. 1 is a schematic diagram of a network scenario of a packet transmission method according to an embodiment of this application.

Embodiments of this application provide a packet transmission method. The method may be applied to a network scenario shown in FIG. 1. As shown in FIG. 1, the network scenario includes a device 1 for sending a packet and a plurality of network devices RT1 to RT9 for receiving the packet. The packet sent by the device 1 is transmitted between RT1 to RT9 through replication and forwarding. For example, the device 1 in this embodiment of this application includes but is not limited to a router, a switch, a server, and the like, and the network devices RT1 to RT9 include but are not limited to a router, a switch, a server, and the like.

The packet transmitted on RT1 to RT9 carries information about a packet transmission path, namely, information about a path RT1 to RT9. In a possible implementation, the information about the packet transmission path is carried by using a node information list, where the node information list includes node information of a device that processes the packet at each hop. A structure of the node information is described in the following embodiments, and details are not described herein again. The network devices (that is, RT1 to RT9) that process the packet at each hop on the packet transmission path process the packet based on the node information list carried in the packet. In this embodiment, the packet processing refers to performing operations such as replicating, forwarding, decapsulating, and continuing to send the packet to an upper-layer device. Correspondingly, the device that processes the packet is a device that performs operations such as replicating, forwarding, decapsulating, and continuing to send the packet to an upper-layer device.

It should be noted that, for ease of understanding below, two concepts of a next-hop device and a next-hop packet processing device in embodiments of this application are distinguished herein. In embodiments of this application, a next-hop device of a network device is a device connected to the network device, and the device connected to the network device may be determined based on a network topology. The network device can transmit a packet to the connected device, and a next-hop packet processing device is a part or all of devices connected to the network device. The next-hop packet processing device may be determined based on a transmission path of a to-be-transmitted packet. The network device transmits the packet to the next-hop packet processing device, so that the next-hop packet processing device processes the packet. RT1 in FIG. 1 is as an example. Next-hop devices of RT1 include RT2 and RT3, to be specific, RT1 is connected to RT2 and RT3 and has a capability of transmitting a packet to RT2 and RT3. Because RT2 and RT3 are on the packet transmission path, RT1 determines, based on the packet transmission path, RT2 and RT3 in the plurality of next-hop devices as next-hop packet processing devices. RT1 transmits a packet to RT2 and RT3, so that RT2 and RT3 process the packet.

Based on different positions of the network devices RT1 to RT9 on the packet transmission path, the network devices RT1 to RT9 may be classified into an ingress node, an intermediate node, and an egress node. The ingress node is a head node device that first transmits a packet on the packet transmission path. The intermediate node receives, on the packet transmission path, a packet sent by a previous-hop packet processing device, replicates the packet, and then forwards a replicated packet to a next-hop packet processing device. The egress node is the last-hop packet processing device on the packet transmission path. In this scenario, an ingress node includes RT1, intermediate nodes include RT2 and RT3, and egress nodes include RT4 to RT9. RT1, as the ingress node, receives a packet sent by the device 1, replicates the packet, and forwards a replicated packet to the plurality of next-hop packet processing devices, namely, RT2 and RT3. RT2 and RT3 receive the packet sent by RT1, then replicate the packet, and forward replicated packets to the plurality of corresponding next-hop packet processing devices, namely, RT4, RT5, and RT6 corresponding to RT2, and RT7, RT8, and RT9 corresponding to RT3. RT4 to RT9, as the plurality of last-hop packet processing devices on the packet transmission path, receive the packets sent by the intermediate nodes, to complete the packet transmission on the path.

Figure 2:
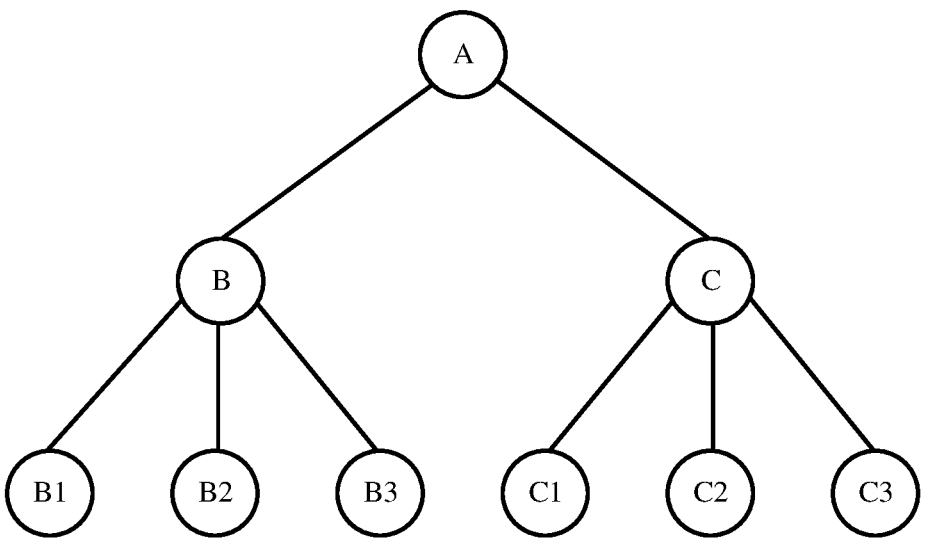
FIG. 2 is a schematic diagram of a packet transmission path according to an embodiment of this application.

FIG. 2 is a schematic diagram of a packet transmission path according to an embodiment of this application. The packet transmission path is simplified from the network scenario shown in FIG. 1. As shown in FIG. 2, a node A is an ingress node on the packet transmission path, a node B and a node C are intermediate nodes on the packet transmission path, and nodes B1 to B3 and nodes C1 to C3 are egress nodes on the packet transmission path. A packet is transmitted by the node A to the node B and the node C, and then transmitted by the node B to the nodes B1 to B3, and transmitted by the node C to the nodes C1 to C3.

With reference to the network scenario shown in FIG. 1 and the packet transmission path shown in FIG. 2, the following describes the packet transmission method provided in embodiments of this application by using an example in which a first device performs the method. A packet provided in embodiments of this application includes node information of the first device. The node information of the first device includes a first bit string indicating N (N is an integer greater than or equal to 1) next-hop devices connected to the first device and first reference information indicating a position of node information of a second device that is in the N next-hop devices and that processes the packet. An encoding manner of the node information is simple, so that packet processing efficiency is improved. In addition, when transmitting the packet to the second device, the first device may obtain a second packet based on the node information of the first device, and then transmit the second packet to the second device, so that a packet transmission process is simple and efficient.

Figure 3:
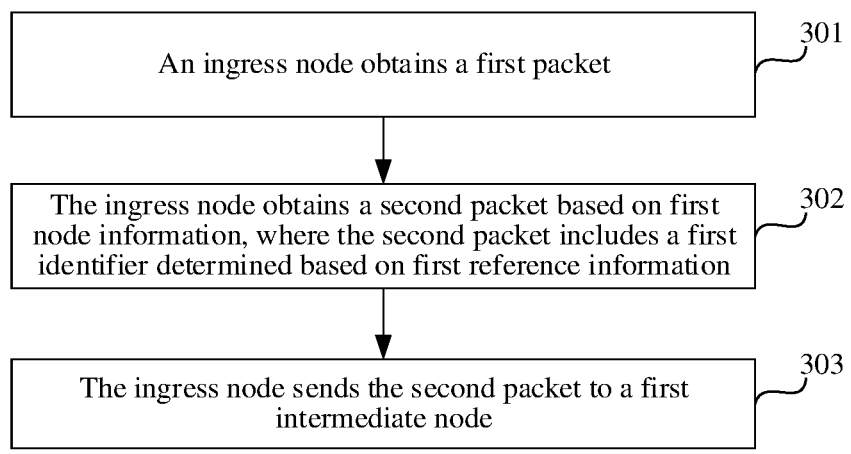
FIG. 3 is a flowchart of a packet transmission method according to an embodiment of this application.

FIG. 3 is a flowchart of a packet transmission method according to an embodiment of this application. The method is applied to an ingress node. The method provided in this embodiment of this application includes but is not limited to the following several processes.

301: The ingress node obtains a first packet.

In a possible implementation, the first packet includes first node information, the first node information includes a first bit string and first reference information, the first bit string indicates N next-hop devices of the ingress node, N is an integer greater than or equal to 1, and the first reference information is used for indexing second node information corresponding to a first intermediate node in the N next-hop devices.

302: The ingress node obtains a second packet based on the first node information, where the second packet includes a first identifier determined based on the first reference information.

In a possible implementation, that the ingress node obtains a second packet based on the first node information includes: The ingress node obtains a first forwarding entry based on the first bit string included in the first node information, where the first forwarding entry includes a bit position and next-hop information, the bit position included in the first forwarding entry corresponds to a first bit in the first bit string, the first bit corresponds to the first intermediate node, and the next-hop information included in the first forwarding entry corresponds to the first intermediate node; the ingress node replicates the first packet based on the first forwarding entry; and the ingress node obtains the second packet based on a replicated first packet and the first reference information included in the first node information. A destination address of the second packet may be an address that is of the first intermediate node and that is obtained based on the next-hop information.

In a possible implementation, the second packet further includes second node information. For content of the second node information, there are the following three possible implementations.

Manner a: The second packet further includes the second node information, the second node information includes a second bit string and second reference information, the second bit string indicates M next-hop devices of the first intermediate node, M is an integer greater than or equal to 1, and the second reference information is used for indexing third node information corresponding to a second intermediate node in the M next-hop devices.

Manner b: The second packet further includes the second node information, the second node information includes a second bit string and second reference information, the second bit string indicates M next-hop devices of the first intermediate node, M is an integer greater than or equal to 1, and the second reference information indicates that the first intermediate node is a previous hop of an egress node.

Manner c: The second packet further includes the second node information, the second node information includes a second bit string and second reference information, the second bit string indicates M next-hop devices of the first intermediate node, M is an integer greater than or equal to 1, and the second reference information indicates to pop up the first node information and the second node information.

A manner of determining a value of the first identifier includes but is not limited to the following manners: If N is 1, the value of the first identifier is a value carried in the first reference information; or if N is an integer greater than 1, the value of the first identifier is a value carried in the first reference information, or the value of the first identifier is a sum of the value carried in the first reference information and an offset. The offset is a difference between a rank of a set bit (for example, being set to 1) corresponding to the first intermediate node in set bits and a rank of the first set bit. For example, if the set bit corresponding to the first intermediate node is the $2^{nd}$ set bit, the offset is 1. An offset of the set bit corresponding to the first intermediate node in the first bit string may be the same as the rank of the set bit (for example, being set to 1) corresponding to the first intermediate node in the set bits, or may be different from the rank of the set bit (for example, being set to 1) corresponding to the first intermediate node in the set bits.

303: The ingress node sends the second packet to the first intermediate node.

In a possible implementation, that the ingress node sends the second packet to the first intermediate node includes: The ingress node sends the second packet to the first intermediate node based on the next-hop information included in the first forwarding entry, where the next-hop information included in the first forwarding entry includes one or more of a port communicating with the first intermediate node and the address of the first intermediate node. When the next-hop information included in the first forwarding entry includes the port communicating with the first intermediate node, the ingress node may search for a correspondence based on the port communicating with the first intermediate node, to obtain the address of the first intermediate node, where the correspondence includes the port communicating with the first intermediate node and the address of the first intermediate node. When the next-hop information included in the first forwarding entry includes the address of the first intermediate node, the ingress node may search for the correspondence based on the address of the first intermediate node, to obtain the port communicating with the first intermediate node. The ingress node may send the second packet through the port communicating with the first intermediate node.

Before implementing the foregoing packet transmission process, the ingress node may further obtain the first forwarding entry. In a possible implementation, the ingress node obtains the bit position corresponding to the first intermediate node and the next-hop information corresponding to the first intermediate node; and the ingress node obtains the first forwarding entry based on the bit position corresponding to the first intermediate node and the next-hop information corresponding to the first intermediate node.

In another possible implementation, the ingress node receives the first forwarding entry sent by a control device.

In a possible implementation, the first packet is an IPv6 packet, the IPv6 packet includes an RH, and the RH includes the first node information.

Figure 4:
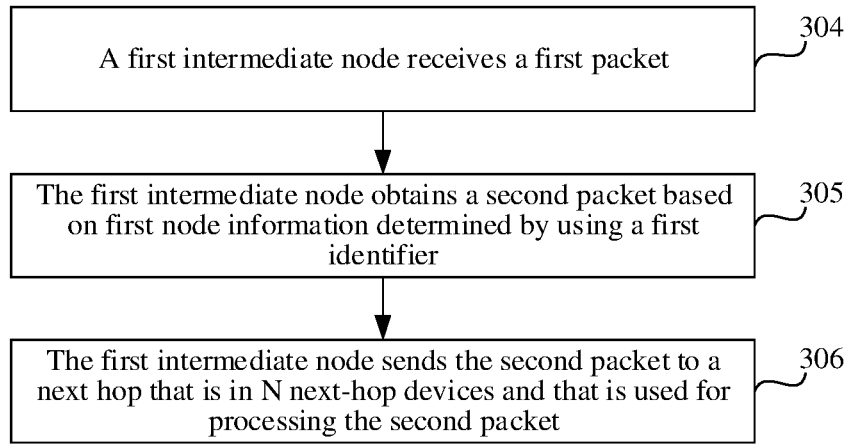
FIG. 4 is a flowchart of a packet transmission method according to an embodiment of this application.

FIG. 4 is a flowchart of a packet transmission method according to an embodiment of this application. The method is applied to a first intermediate node. The method provided in this embodiment of this application includes but is not limited to the following several processes.

304: The first intermediate node receives a first packet.

The first packet includes a first identifier and first node information, the first identifier is used for indexing the first node information, the first node information includes a first bit string and first reference information, the first bit string indicates M next-hop devices of the first intermediate node, and M is an integer greater than or equal to 1. The M next-hop devices may be other intermediate nodes, or the M next-hop devices are egress nodes.

305: The first intermediate node obtains a second packet based on the first node information determined by using the first identifier.

In a possible implementation, a next hop used for processing the second packet is a second intermediate node, the first packet further includes second node information, and the first reference information is used for indexing the second node information.

Based on different types of next hops for processing the second packet, manners in which the first intermediate node obtains the second packet are different, including but not limited to the following several manners.

Manner A: When the next hop used for processing the second packet is the second intermediate node, that the first intermediate node obtains a second packet based on the first node information determined by using the first identifier includes: The first intermediate node obtains the first node information from the first packet based on the first identifier; the first intermediate node obtains a first forwarding entry based on the first bit string included in the first node information, where the first forwarding entry includes a bit position and next-hop information, the bit position included in the first forwarding entry corresponds to a first bit in the first bit string, the first bit corresponds to the second intermediate node, and the next-hop information included in the first forwarding entry corresponds to the second intermediate node; the first intermediate node replicates the first packet based on the first forwarding entry; and the first intermediate node obtains the second packet based on a replicated first packet and the first reference information included in the first node information, where the second packet includes a second identifier, and the second identifier is a value determined based on the first reference information.

A process of determining the second identifier in the manner A includes: If M is 1, the value of the second identifier is a value carried in the first reference information; or if M is an integer greater than 1, the value of the second identifier of the second packet is a value carried in the first reference information, or the value of the second identifier of the second packet is a sum of the value carried in the first reference information and an offset. A meaning of the offset is the same as the meaning of the offset in the embodiment corresponding to FIG. 3, and details are not described herein again.

Manner B: When the next hop used for processing the second packet is an egress node, the first reference information indicates that the first intermediate node is a previous hop of the egress node.

In the manner B, that the first intermediate node obtains a second packet based on the first node information determined by using the first identifier includes: The first intermediate node obtains the first node information from the first packet based on the first identifier; the first intermediate node obtains a first forwarding entry based on the first bit string included in the first node information, where the first forwarding entry includes a bit position and next-hop information, the bit position included in the first forwarding entry corresponds to a first bit in the first bit string, the first bit corresponds to the egress node, and the next-hop information included in the first forwarding entry corresponds to the egress node; the first intermediate node replicates the first packet based on the first forwarding entry; and the first intermediate node obtains the second packet based on a replicated first packet and the first reference information included in the first node information.

The second packet obtained in the manner B further includes a second identifier, and the second identifier is a value determined based on the first reference information; or the second packet does not include the first node information or the first identifier, to be specific, a packet header that carries the first node information and the first identifier may be popped up in the second packet.

306: The first intermediate node sends the second packet to the next hop that is in the M next-hop devices and that is used for processing the second packet.

Corresponding to the foregoing manner A and manner B of obtaining the second packet, the first intermediate node also sends the second packet in different manners.

Corresponding to the foregoing manner A, when the next hop used for processing the second packet is the second intermediate node, that the first intermediate node sends the second packet to the next hop that is in the M next-hop devices and that is used for processing the second packet includes: The first intermediate node sends the second packet to the second intermediate node based on the next-hop information included in the first forwarding entry, where the next-hop information included in the first forwarding entry includes one or more of a port communicating with the second intermediate node and an address of the second intermediate node.

Corresponding to the foregoing manner B, when the next hop used for processing the second packet is the egress node, that the first intermediate node sends the second packet to the next hop that is in the M next-hop devices and that is used for processing the second packet includes: The first intermediate node sends the second packet to the egress node based on the next-hop information included in the first forwarding entry, where the next-hop information included in the first forwarding entry includes one or more of a port communicating with the egress node and an address of the egress node.

Before implementing the foregoing packet transmission process, the first intermediate node may further obtain the first forwarding entry. In a possible implementation, the first intermediate node obtains the bit position corresponding to the next hop used for processing the second packet and the next-hop information corresponding to the next hop used for processing the second packet; and the first intermediate node obtains the first forwarding entry based on the bit position corresponding to the next hop used for processing the second packet and the next-hop information corresponding to the next hop used for processing the second packet; or the first intermediate node receives the first forwarding entry sent by a control device.

In a possible implementation, the first packet is an internet protocol version 6 IPv6 packet, the IPv6 packet includes a routing header RH, and the RH includes the first identifier and the first node information.

Figure 5:
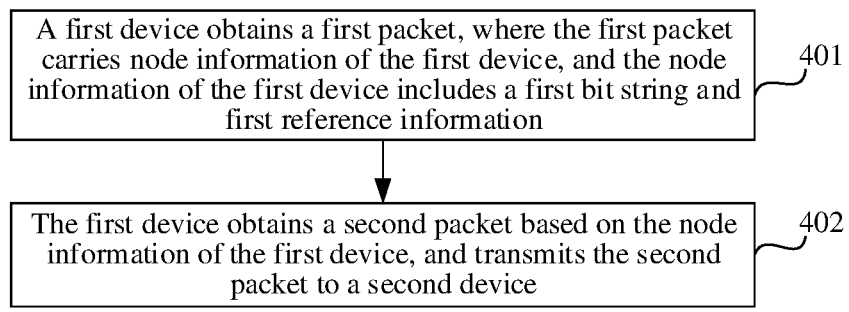
FIG. 5 is a flowchart of a packet transmission method according to an embodiment of this application.

With reference to the packet transmission methods shown in FIG. 3 and FIG. 4, FIG. 5 is a flowchart of a packet transmission method according to an embodiment of this application. The method may be applied to either of an ingress node and an egress node. In the embodiment shown in FIG. 5, node information of a first device is equivalent to the foregoing first node information, node information of a second device is equivalent to the foregoing second node information, a bit position identifier is equivalent to the foregoing bit position, and a next-hop address or a port for transmitting a packet to a next hop is equivalent to the foregoing next-hop information.

The method is not limited to the following processes.

401: The first device obtains a first packet, where the first packet carries the node information of the first device, and the node information of the first device includes a first bit string and first reference information.

The first bit string indicates N next-hop devices connected to the first device, where N is an integer greater than or equal to 1. The first reference information indicates a position of the node information of the second device, the second device is a device that is in the N next-hop devices and that processes a second packet, and the second packet is a packet transmitted by the first device to the second device. When N is 1, the second device is a next-hop device connected to the first device.

Figure 6:
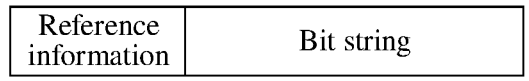
FIG. 6 is a schematic diagram of a structure of node information according to an embodiment of this application.

FIG. 6 is a schematic diagram of a structure of node information according to an embodiment of this application. As shown in FIG. 6, the node information includes reference information and a bit string. Each bit in the bit string indicates each next-hop device connected to a device to which the node information belongs, the bit corresponds one-to-one to the next-hop device, and the reference information indicates a position of node information of a packet processing device in the next-hop devices connected to the device to which the node information belongs. For the node information of the first device, reference information in the node information of the first device is referred to as the first reference information, and a bit string in the node information of the first device is referred to as the first bit string. The first bit string indicates the N next-hop devices connected to the first device, so that a quantity of next-hop devices that can be indicated by the node information of the first device can be increased. Therefore, a packet transmission path is extended.

Each bit in the first bit string indicates each next-hop device connected to the first device. The first device may be connected to a plurality of next-hop devices, and not all the plurality of next-hop devices exist in the packet transmission path; in other words, not all the plurality of next-hop devices are packet processing devices; in other words, not all the plurality of next-hop devices are second devices. Therefore, in this embodiment of this application, a bit to which the second device belongs and a bit to which the second device does not belong are distinguished in the first bit string. In a possible implementation, the first bit string includes a first bit, and the first bit indicates that a device corresponding to the first bit is the second device. That the first reference information indicates a position of the node information of the second device may include the following cases.

Case 1: The first reference information indicates a reference position, and the reference position is a position of node information of a device corresponding to a reference bit in the first bit string. The reference bit is a bit that is defined in the first bit string and that is used as a reference. If the position of the node information of the second device needs to be obtained, an offset between the position of the node information of the second device and the reference position may be correspondingly obtained provided that an offset between the first bit that the second device belongs and the reference bit is learned of, so that the position of the node information of the second device is obtained based on the reference position and the offset.

Case 2: The first reference information indicates that the first device is the penultimate hop on a transmission path of the first packet. When the first device is the penultimate hop on the transmission path of the first packet, the second device is the last hop on the transmission path of the first packet, namely, an egress node. It can be learned from the foregoing descriptions of the egress node that, no packet processing device exists after the egress node, so that the node information of the second device does not indicate a next-hop packet processing device. Therefore, the first packet provided in this embodiment of this application does not include node information of an egress node. To be specific, when the first reference information indicates that the first device is the penultimate hop on the transmission path of the first packet, it indicates that the second device is the egress node on the transmission path of the first packet, that is, the node information of the second device does not exist in the first packet.

The first reference information indicates the position of the node information of the second device, so that the node information of the second device can be quickly positioned. Therefore, packet processing efficiency is improved.

Optionally, the node information of the first device may be carried in a node information list of the first packet, and the node information list may further include node information of a packet processing device other than the first device and the last-hop device on the transmission path of the first packet. FIG. 7 is a schematic diagram of a structure of a node information list according to an embodiment of this application. The node information list corresponds to the packet transmission path shown in FIG. 2.

It should be noted that, if A is the first device, and B and C correspond to the second device, the node information list includes the node information of the first device and the node information of the second device; if B is the first device, and B1 to B3 correspond to the second device, the node information list includes only the node information of the first device; or if C is the first device, and C1 to C3 correspond to the second device, the node information list includes only the node information of the first device. However, regardless of which one of A, B, or C is the first device, the node information list includes the node information of the first device.

In addition, a segment left in FIG. 7 indicates an arrangement order of node information in the node information list in FIG. 7, but the segment left may not exist in an actual node information list. Based on the arrangement of segment left, in the node information list, a position of the first piece of node information is a position of node information whose segment left is 0, a position of the second piece of node information is a position of node information whose segment left is 1, and a position of the third piece of node information is a position of node information whose segment left is 2.

For example, A is the first device, and B and C are second devices. In this case, "1" in node information of A corresponds to the first reference information, and "110000" corresponds to the first bit string. Each bit in "110000" indicates each next-hop device connected to A. For example, "110000" includes six bits, and the six bits respectively correspond to six next-hop devices connected to A. Further, two bits that are set to "1" in "110000", that is, the two "1"s in "110000", are the foregoing first bits, and the two "1"s indicate that two devices corresponding to the two "1"s are B and C.

"1" in the first reference information indicates positions of node information of B and C. In this example, "1" in the first reference information indicates a reference position, to be specific, a position of node information of a device corresponding to a reference bit in "110000" in the node information list. In this example, the $1^{st}$ bit that is set to "1" in "110000" is selected as the reference bit, and "1" corresponding to the first reference information indicates that a position (namely, the reference position) of node information of a device corresponding to the $1^{st}$ bit that is set to "1" in the node information list is a position of the second piece of node information (that is, the segment left is 1).

In the bits that are set to "1" (also the first bits) in "110000", if an offset between the first bit that is set to "1" and the reference bit is 0, an offset between the node information of the device corresponding to the $1^{st}$ bit that is set to "1" and the reference position is 0, and the node information of the device corresponding to the $1^{st}$ bit that is set to "1" is the second piece of node information, namely, the node information of B, in the node information list. In the bits that are set to "1" (also the first bits) in "110000", if an offset between the $2^{nd}$ bit that is set to "1" and the reference bit is 1, an offset between node information of a device corresponding to the $2^{nd}$ bit that is set to "1" and the reference position is 1, and the node information of the device corresponding to the $2^{nd}$ bit that is set to "1" is the third piece of node information, namely, the node information of C, in the node information list.

It should be noted that, that the second piece of node information is the node information of B and the third piece of node information is the node information of C herein are merely an example. An arrangement order of the node information of B and the node information of C is not limited in this embodiment of this application. In other words, an arrangement order of the node information of the second devices is not limited in this embodiment of this application. In some embodiments, the second piece of node information in the node information list may alternatively be the node information of C, and the third piece of node information may alternatively be the node information of B.

For example, B is the first device, and B1 to B3 are second devices. In this case, "0" in node information of B corresponds to the first reference information, and "111000" corresponds to the first bit string. "111000" indicates a plurality of next-hop devices connected to B, and the three bits that are set to "1" in "111000" indicate B1 to B3. If "0" in the first reference information indicates that B is the penultimate hop on a packet transmission path, B1 to B3 are egress nodes on the packet transmission path, to be specific, node information of B1 to B3 does not exist in the node information list.

For example, C is the first device and C1 to C3 are second devices. In this case, for descriptions of node information of C, refer to the descriptions of the node information of B when B is the first device and B1 to B3 are the second devices. Details are not described herein again.

It should be noted that, in the node information list in this example, the first bit is represented by being set to "1", and bits other than the first bit are represented by being set to "0". In some examples, a method for representing the first bit may alternatively be flexibly set based on an actual requirement. This is not limited in this embodiment of this application. For example, the first bit may alternatively be represented by being set to "0", and bits other than the first bit may alternatively be represented by being set to "1".

The following describes, by using an example, a manner of carrying the node information list. In a possible implementation, the first packet is an internet protocol version 6 (IPv6) packet, the node information list is carried in a routing header (RH) of the IPv6 packet, and the node information list is a segment list of the RH. In an IPv6 network, the packet transmission method provided in this application can be used for improving network scalability and a network transmission speed.

FIG. 8 is a schematic diagram of a structure of an IPv6 packet header according to an embodiment of this application. A value of a next header field is a value indicating that a next header is a routing header RH, indicating that a next header following the IPv6 packet header is the RH. For example, the value of the next header field is 43. It should be noted that the IPv6 packet header includes a destination address field, the destination address field is used for storing an internet protocol (IP) address of a next-hop device when a packet is transmitted, and the IP address of the next-hop device is used for finding the next-hop device in a network. For example, in a packet transmitted by the first device to the second device, a destination address field of the packet stores an IP address of the second device. In addition, the IPv6 packet header includes version, traffic class, flow label, payload length, hop limit, and source address fields.

FIG. 9 is a schematic diagram of a structure of an RH header according to an embodiment of this application. The RH header is located after the IPv6 packet header. The RH header provided in this embodiment of this application is a new IPv6 extension header. As shown in the figure, a value of a routing type field in the RH header is to be allocated by the internet assigned numbers authority (TANA), and uniquely indicates the RH header provided in this embodiment of this application. In addition, a type-specific data field and a more type-specific data field are used for storing data required by the type of RH header. For a specific structure of the RH header provided in this embodiment of this application, refer to the following related descriptions in FIG. 10.

Figures 10, 11, 12:
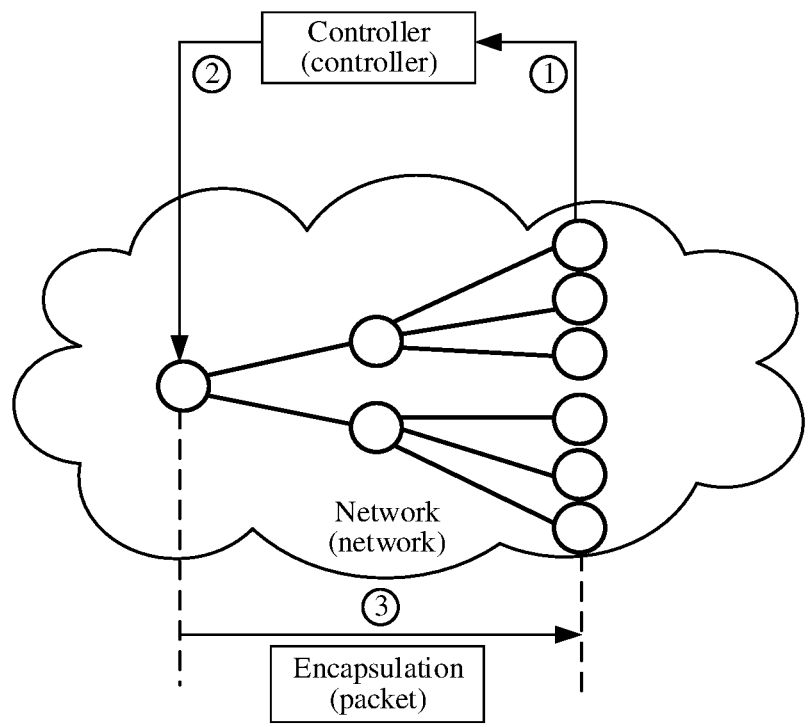
FIG. 10 is a schematic diagram of a structure of an RH header according to an embodiment of this application.
FIG. 11 is a schematic diagram of a method for obtaining a first packet according to an embodiment of this application.
FIG. 12 is a schematic diagram of a structure of a forwarding entry according to an embodiment of this application.

FIG. 10 is a schematic diagram of a structure of an RH header according to an embodiment of this application. A bitstring type field, a segment length field, and a reserved field are stored in the type-specific data field in FIG. 9. A segment 0 to a segment n are stored in the more type-specific data field in FIG. 9. The segment 0 to the segment n are arranged together to form a segment list, and the segment list is the node information list described above. In addition, the RH header further includes a next header field and a header extension length field.

It should be noted that, in both FIG. 9 and FIG. 10, there is a segments left field, which is different from the segment left that indicates only the arrangement order of the node information in FIG. 7. The segments left field in FIG. 10 indicates a position of node information of a current packet processing device in the node information list. For example, when the segments left field is 1, it indicates that the node information of the current packet processing device is the segment 0.

When a device processes a packet, to enable the device to quickly find node information corresponding to the device, in a possible implementation, the first packet carries a first identifier, and the first identifier indicates the first device to process the first packet. For example, the first identifier may be a value shown in a segment left field in the first packet. In a possible implementation, the second packet carries a second identifier, and the first identifier indicates the first device to process the second packet. For example, the second identifier may be a value shown in a segment left field in the second packet.

With reference to the foregoing descriptions of the structure of the first packet, the following describes a process in which the first device obtains the first packet. Based on the foregoing descriptions of the nodes at different positions on the packet transmission path, the process in which the first device obtains the first packet includes but is not limited to the following two cases.

Case a: If the first device is an intermediate node on the transmission path of the first packet, that the first device obtains a first packet includes: receiving the first packet sent by a previous-hop packet processing device.

Case b: If the first device is an ingress node on the transmission path of the first packet, that the first device obtains a first packet includes: obtaining a fifth packet; obtaining the node information of the first device; and adding the node information of the first device to the fifth packet, to obtain the first packet.

In a possible implementation, the obtaining the node information of the first device includes: obtaining a correspondence between the first bit string and the N next-hop devices, and generating the node information of the first device based on the correspondence between the first bit string and the N next-hop devices and a transmission path of the fifth packet. A in FIG. 7 is used as an example. In this case, corresponding information of A indicates that in the bit string of the node information of A, the $1^{st}$ bit indicates B, and the $2^{nd}$ bit indicates C.

Optionally, on the transmission path of the first packet, other than the last-hop packet processing device, each other packet processing device has a bit string corresponding to the device, and there is a correspondence between the bit string and N next-hop devices of the device. In this case, on the transmission path of the first packet, other than the last-hop packet processing device, each other packet processing device may report, to the first device, the correspondence between the bit string of each packet processing device and the N next-hop devices of the packet processing device. The first device may further generate a node information list based on the received correspondence between the bit string of each packet processing device and the N next-hop devices of the packet processing device and the transmission path of the fifth packet. A in FIG. 7 is used as an example. In this case, corresponding information reported by B indicates that in the bit string of the node information of B, the $1^{st}$ bit indicates B1, the $2^{nd}$ bit indicates B2, and the $3^{rd}$ bit indicates B3.

In another possible implementation, the obtaining the node information of the first device includes: receiving the node information that is of the first device and that is sent by a fourth device. The fourth device may be a control device. Optionally, the first device may report a correspondence between the first bit string and the N next-hop devices to the control device. The control device generates the node information of the first device based on the correspondence between the first bit string and the N next-hop devices and a transmission path of the fifth packet, and then delivers the node information of the first device to the first device. Further, the control device may further generate a node information list based on a received correspondence between a bit string of each packet processing device and N next-hop devices of the packet processing device and the transmission path of the fifth packet, and then deliver the node information list to the first device.

FIG. 11 is a schematic diagram of a method for obtaining the first packet. The control device receives the correspondence between the bit string reported by each packet processing device and the N next-hop devices of the packet processing device (referring to ①); generates, with reference to the transmission path of the fifth packet, an RH header that carries the node information list; and delivers the RH header to the first device serving as the ingress node (referring to ②). Then, the first device encapsulates the RH header into the fifth packet to obtain the first packet (referring to ③).

402: The first device obtains the second packet based on the node information of the first device, and transmits the second packet to the second device.

With reference to the related content in FIG. 9 and FIG. 10, it can be learned that the first packet carries the first identifier. To enable the first device to quickly position the node information of the first device, in a possible implementation, before the packet is transmitted to the second device based on the node information of the first device, the method further includes: determining the node information of the first device based on the first identifier.

It should be noted that when the first device is the ingress node of the packet transmission path, the first device can autonomously obtain the first piece of node information in the node information list, namely, the node information of the first device. Therefore, the first device may determine the node information of the first device based on the first identifier, or may directly determine the node information of the first device without the first identifier. This is not limited in this embodiment of this application.

In a possible implementation, that the first device obtains the second packet based on the node information of the first device, and transmits the second packet to the second device includes the following steps.

3021: Replicate the first packet based on the first bit string, to obtain a third packet.

In a possible implementation, the replicating the first packet based on the first bit string, to obtain a third packet includes: replicating a second quantity of first packets to obtain a second quantity of third packets, where the second quantity is a quantity of first bits included in the first bit string. For example, A in FIG. 7 is used as the first device, and the first bit string "110000" includes two first bits. In this case, A replicates two first packets, to obtain two third packets.

3022: Determine a first forwarding entry based on the first bit in the first bit string.

As described above, the first bit indicates that the device corresponding to the first bit is the second device. In a possible implementation, the first forwarding entry includes a first position identifier, and the first position identifier identifies a position of the first bit in the first bit string. The determining a first forwarding entry based on the first bit in the first bit string includes: determining the first position identifier based on the position of the first bit in the first bit string, and determining the first forwarding entry based on the first position identifier. The first forwarding entry is determined by using the first position identifier, so that the first forwarding entry corresponding to the first bit can be quickly found. Therefore, packet transmission efficiency is improved.

FIG. 12 is a schematic diagram of a structure of a forwarding entry according to an embodiment of this application. The forwarding entry includes a bit position identifier, a port, and a next-hop address. The bit position identifier indicates a position of a bit in a bit string of a device to which the forwarding entry belongs, the next-hop address indicates an address of a next-hop device corresponding to the bit, and the port indicates a port used when the device to which the forwarding entry belongs transmits a packet to the next-hop device corresponding to the bit. In this embodiment of this application, a bit position identifier determined based on the first bit is referred to as the first position identifier, and a forwarding entry determined based on the first position identifier is referred to as the first forwarding entry.

The node A in FIG. 7 is still used as an example. FIG. 13 is a schematic diagram of a structure of a forwarding table according to an embodiment of this application. The forwarding table is a forwarding table on the node A, and includes three forwarding entries. The first forwarding entry indicates the $1^{st}$ bit in the bit string of the node A, a corresponding next-hop device address is an address of the node B, and a port used by the node A to forward a packet to the node B is an outbound interface 1. The second forwarding entry indicates the $2^{nd}$ bit in the bit string of the node A, a corresponding next-hop device address is an address of the node C, and a port used by the node A to forward a packet to the node C is an outbound interface 2. The third forwarding entry indicates the $3^{rd}$ bit in the bit string of the node A, a corresponding next-hop device address is an address of a node D, and a port used by the node A to forward a packet to the node D is an outbound interface 3.

The node A determines, based on a case in which the $1^{st}$ bit being set to "1" in the first bit string "110000" is the $1^{st}$ bit in the first bit string, that a first position identifier is 1, and determines, based on the first position identifier 1, a first forwarding entry whose position identifier is 1 in the forwarding table shown in FIG. 13. The node A determines, based on a case in which the $2^{nd}$ bit being set to "1" in the first bit string "110000" is the $2^{nd}$ bit in the first bit string, that a first position identifier is 2, and determines, based on the first position identifier 2, a first forwarding entry whose position identifier is 2 in the forwarding table shown in FIG. 13.

2023: Generate the second packet based on the first forwarding entry, the first reference information, and the third packet.

With reference to the foregoing descriptions of the structure of the IPv6 packet header, the first forwarding entry, and the first reference information, in a possible implementation, the first forwarding entry includes the internet protocol IP address of the second device, the third packet carries a destination address field and the first identifier, and the generating the second packet based on the first forwarding entry, the first reference information, and the third packet includes: updating the destination address field of the third packet to the IP address of the second device, to obtain a fourth packet; and updating the first identifier of the fourth packet to the second identifier based on the first reference information, to obtain the second packet.

In a possible implementation, the first reference information indicates a reference position, the reference position includes a position, in the node information list, of node information of a device corresponding to a reference bit in the first bit string, and the updating the first identifier of the fourth packet to the second identifier based on the first reference information includes: obtaining, based on the position of the first bit in the first bit string, a first quantity of first bits that are offset from the first bit to the reference bit; determining a position of the node information of the second device in the node information list based on the reference position and the first quantity, and updating the first identifier of the fourth packet to the second identifier based on the position of the node information of the second device in the node information list.

The forwarding table of the node A shown in FIG. 13 is used as an example. The node A determines, based on a case in which the $1^{st}$ bit being set to "1" in the first bit string "110000" is the $1^{st}$ bit in the first bit string, a first forwarding entry whose position identifier is 1. The node A updates, based on a case in which the next-hop address is the node B in the first forwarding entry, a destination address field of the third packet to the node B, to generate the fourth packet. An offset between the $1^{st}$ bit being set to "1" and a reference bit (where the reference bit is the $1^{st}$ bit being set to "1" in this example) is calculated as 0. Then, based on a case in which the reference position indicated by the first reference information is 1, it is determined that a position of the node information of the node B in the node information list is the second piece of node information, and a value (for example, a value of a segment left field) of the first identifier of the fourth packet is updated to 1, to generate the second identifier.

In a possible implementation, the first reference information indicates that the first device is the penultimate hop on the transmission path of the first packet, and the updating the first identifier of the fourth packet to the second identifier based on the first reference information includes: updating the first identifier of the fourth packet to a first reference value, and using the updated first identifier as the second identifier. The second identifier indicates that the second device is the egress node on the transmission path of the first packet.

FIG. 14 is a schematic diagram of a structure of a forwarding table according to an embodiment of this application. The forwarding table is a forwarding table on the node B in FIG. 7. The node B determines, based on a case in which the $1^{st}$ bit being set to "1" in the first bit string "111000" is the $1^{st}$ bit in the first bit string, a first forwarding entry whose position identifier is 1. The node B updates, based on a case in which a next-hop address is the node B1 in the first forwarding entry, a destination address field of the third packet to the node B1, to generate the fourth packet. An offset between the $1^{st}$ bit being set to "1" and a reference bit (where the reference bit is the $1^{st}$ bit being set to "1" in this example) is calculated as 0. Then, based on the first reference information being 0, it is determined that the node B is the penultimate hop on the packet transmission path, and a value of the first identifier (for example, a value of a segment left field) of the fourth packet is updated to a first reference value to generate the second identifier, where the second identifier indicates that the node B1 is an egress node on the transmission path of the first packet.

It should be noted that a sequence of "replicating the first packet based on the first bit string" and "determining a first forwarding entry based on the first bit in the first bit string" is not limited in this embodiment of this application. In some embodiments, the first device may alternatively first replicate the first packet based on any first bit in the first bit string; determine, based on the first bit, a first forwarding entry corresponding to the first bit; and then obtain, based on the first forwarding entry corresponding to the first bit and the first reference information, the packet corresponding to the first bit. Then, the first device replicates the first packet based on any remaining first bit in the first bit string, and repeats a step of obtaining a packet corresponding to any next first bit.

In some embodiments, when the first reference information indicates that the first device is the penultimate hop on the transmission path of the first packet, the first device pops out a node information list of the fourth packet, or pops out an extension header (for example, an RH header) in which the node information list is located in the fourth packet.

According to the foregoing two methods for determining the second identifier, the second device can receive the second packet, quickly position the node information of the second device, process the packet, and transmit the packet to a next-hop packet processing device. This further improves packet transmission efficiency.

In a possible implementation, before the determining a first forwarding entry based on the first bit in the first bit string, the method further includes: obtaining a correspondence between the first bit and the second device, and generating the first forwarding entry based on the correspondence between the first bit and the second device. For example, the first device may allocate, to the first bit, a corresponding address of the second device and a port for transmitting a packet to the second device, to form the correspondence between the first bit and the second device, and further generate the first forwarding entry.

In another possible implementation, before the determining a first forwarding entry based on the first bit in the first bit string, the method further includes: receiving the first forwarding entry sent by a third device.

For example, the third device may be a control device. The first device reports port information to the control device, and the second device reports address information to the control device. The control device generates a correspondence between a port of the first device and the address of the second device based on the port of the first device and the address of the second device, and then allocates a first bit to the correspondence between the port of the first device and the address of the second device, to generate a correspondence between the first bit and the second device, so as to generate the first forwarding entry. The control device then delivers the first forwarding entry to the first device.

3024: Transmit the second packet to the second device based on the first forwarding entry.

With reference to the foregoing descriptions of the first forwarding entry, in a possible implementation, the first forwarding entry includes a first outbound port that is used by the first device to forward the second packet to the second device, and the transmitting the second packet to the second device based on the first forwarding entry includes: transmitting the second packet to the second device through the first outbound port.

When the first device is an egress node, after the first device obtains the first packet, if the first packet carries the first identifier, the first device indicates, based on the first identifier in the first packet, that the node information of the first device does not exist in the first packet, decapsulates the first packet, and then sends or forwards the decapsulated first packet to directly connected user equipment; or if the first packet does not carry the first identifier (that is, all node information and the first identifier are popped up at the penultimate hop), the first device directly sends or forwards the first packet to directly connected user equipment.

According to the method provided in this embodiment of this application, the first device may quickly determine, by using the first bit string and the first reference information that are in the node information of the first device and that are carried in the packet, the second device that processes the packet in the next-hop devices, obtain the second packet based on the node information of the first device, and then transmit the second packet to the second device, so that a packet transmission process is simple and efficient. In addition, the node information of the first device includes the structures of the first bit string and the first reference information, so that a packet encoding manner is simple, and the packet processing efficiency and the packet transmission efficiency of the first device are also improved.

Figures 15, 16:
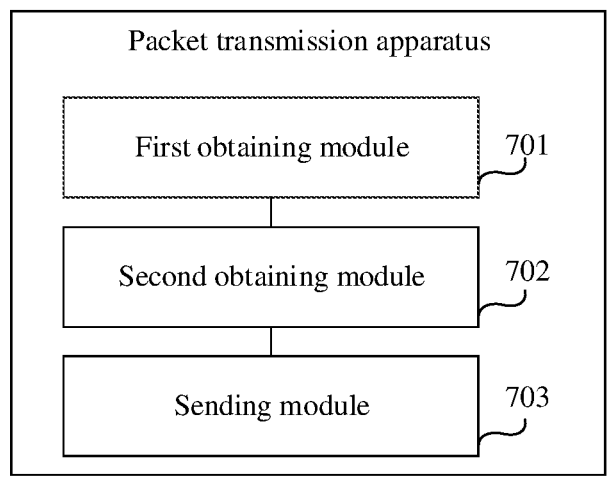
FIG. 15 is a schematic diagram of a structure of a forwarding table according to an embodiment of this application.
FIG. 16 is a schematic diagram of a packet transmission apparatus according to an embodiment of this application.

The following uses the forwarding path shown in FIG. 2 as an example to describe the packet transmission method provided in embodiments of this application. In this example, the extended RH header defined above is referred to as a multicast routing header (MRH), and the first reference information is referred to as SL-S. In addition to FIG. 7, FIG. 13, and FIG. 14 related to the embodiment in FIG. 2, FIG. 15 is further added for supplementary description. FIG. 15 is a schematic diagram of a structure of a forwarding table according to an embodiment of this application.

601: The node A encapsulates an MRH into a packet.

The node A encapsulates, into the packet, the MRH received from a controller, where the MRH carries the node information list shown in FIG. 7, the first piece of node information is node information of the node A, the second piece of node information is node information of the node B, and the third piece of node information is node information of the node C. The controller in this embodiment of this application may be the control device mentioned in the foregoing embodiment.

602: The node A separately transmits the packet to the node B and the node C based on the MRH.

The node A reads the node information of the node A. If two bits in a bit string in the node information of the node A are set to 1, the node A replicates the packet twice. The node A queries the forwarding table shown in FIG. 13, and determines, in the forwarding table, forwarding entries whose bit positions are 1 and 2 based on a case in which the bits in the bit string that are set to 1 are respectively the $1^{st}$ bit and the $2^{nd}$ bit in the bit string. In the forwarding entry whose bit position is 1, an outbound port is an interface 1, and a next-hop address is an address of the node B. In the forwarding entry whose bit position is 2, an outbound port is an interface 2, and a next-hop address is an address of the node C.

The node A updates a destination address of one of the replicated packets to the address of the node B, where the packet carrying the address of the node B is a packet corresponding to the forwarding entry whose bit position is 1; and updates a destination address of the other replicated packet to the address of the node C, where the packet carrying the address of the node C is a packet corresponding to the forwarding entry whose bit position is 2.

The node A further sets, based on a case in which SL-S in the node information of the node A is 1 (where a reference bit is the $1^{st}$ bit being set to 1 in this example), a segment left field in the packet corresponding to the forwarding entry whose bit position is 1, to 1, to generate a packet corresponding to the node B; and sets, based on an offset 1 of the $2^{nd}$ bit being set to 1 relative to the $1^{st}$ bit being set to 1, a segment left field in the packet corresponding to the forwarding entry whose bit position is 2, to 2, to generate a packet corresponding to the node C.

The node A node forwards, to the node B through the interface 1, the packet corresponding to the node B, and forwards, to the node C through the interface 2, the packet corresponding to the node C.

603: The node B separately transmits the packet to the node B1 to the node B3 based on the MRH in the packet.

After receiving the packet corresponding to the node B, the node B determines, based on a case in which a segment left field in the MRH is 1, that a position of the node information of the node B in the MRH is the second piece of node information. The node B replicates the packet three times based on a case in which three bits of a bit string in the node information of the node B are set to 1. The node B queries the forwarding table shown in FIG. 14, and determines, in the forwarding table, forwarding entries whose bit positions are 1, 2, and 3 based on a case in which the bits in the bit string that are set to 1 are respectively the $1^{st}$ bit, the $2^{nd}$ bit, and the $3^{rd}$ bit in the bit string. In the forwarding entry whose bit position is 1, an outbound port is the interface 1, and a next-hop address is an address of the node B1. In the forwarding entry whose bit position is 2, an outbound port is the interface 2, and a next-hop address is an address of the node B2. In the forwarding entry whose bit position is 3, an outbound port is an interface 3, and a next-hop address is an address of the node B3.

The node B updates a destination address of one of the replicated packets to the address of the node B1, where the packet carrying the address of the node B1 is a packet corresponding to the forwarding entry whose bit position is 1; updates a destination address of one of remaining replicated packets to the address of the node B2, where the packet carrying the address of the node B2 is a packet corresponding to the forwarding entry whose bit position is 2; and updates a destination address of the other remaining replicated packet to the address of the node B3, where the packet carrying the address of the node B3 is a packet corresponding to the forwarding entry whose bit position is 3.

The node B further determines, based on a case in which SL-S in the node information of the node B is 0, that the node B is the penultimate-hop device on the packet transmission path, to be specific, a next-hop packet processing device after the node B is an egress node on the packet transmission path. The node B sets, to 0, a segment left field in the packet corresponding to the forwarding entry whose bit position is 1, to generate a packet corresponding to the node B1; sets, to 0, a segment left field in the packet corresponding to the forwarding entry whose bit position is 2, to generate a packet corresponding to the node B2; and sets, to 0, a segment left field in the packet corresponding to the forwarding entry whose bit position is 3, to generate a packet corresponding to the node B3.

The node B forwards, to the node B1 through the interface 1, the packet corresponding to the node B1, forwards, to the node B2 through the interface 2, the packet corresponding to the node B2, and forwards, to the node B3 through the interface 3, the packet corresponding to the node B3.

In addition, a process in which the node C separately transmits the packet to the node C1 to the node C3 based on the MRH in the packet is similar to a process in which the node B separately transmits the packet to the node B1 to the node B3 based on the MRH in the packet. In addition, for a forwarding table on the node C, refer to the forwarding table shown in FIG. 15. To avoid redundancy, details are not described herein again.

604: The node B1 indicates, based on the MRH, that the node B1 is the egress node of the packet transmission path, and decapsulates the packet.

After receiving the packet corresponding to the node B1, the node B1 determines, based on a case in which the segment left field in the MRH is 0, that the node B1 is the egress node on the packet transmission path, and decapsulates or sends the packet.

In addition, after the node B2, the node B3, and the node C1 to the node C3 that are also used as egress nodes of the packet transmission path receive the packet, a packet processing process is similar to that of the node B1. For details, refer to the processing process of the node B1. Details are not described in this embodiment of this application.

FIG. 16 is a schematic diagram of a packet transmission apparatus according to an embodiment of this application. Based on the following modules shown in FIG. 16, the packet transmission apparatus shown in FIG. 16 can perform all or some operations of the ingress node and the intermediate node in the packet transmission method shown in FIG. 2 to FIG. 15. It should be understood that the apparatus may include more additional modules than the shown modules or omit some of the shown modules. This is not limited in embodiments of this application. The apparatus includes but is not limited to a first obtaining module 701, a second obtaining module 702, and a sending module 703.

The apparatus is used in an ingress node. In this case, the first obtaining module 701 is configured to obtain a first packet, where the first packet includes first node information, the first node information includes a first bit string and first reference information, the first bit string indicates N next-hop devices of the ingress node, N is an integer greater than or equal to 1, and the first reference information is used for indexing second node information corresponding to a first intermediate node in the N next-hop devices; the second obtaining module 702 is configured to obtain a second packet based on the first node information, where the second packet includes a first identifier determined based on the first reference information; and the sending module 703 is configured to send the second packet to the first intermediate node.

In a possible implementation, the first obtaining module 701 is configured to: obtain a first forwarding entry based on the first bit string included in the first node information, where the first forwarding entry includes a bit position and next-hop information, the bit position included in the first forwarding entry corresponds to a first bit in the first bit string, the first bit corresponds to the first intermediate node, and the next-hop information included in the first forwarding entry corresponds to the first intermediate node; replicate the first packet based on the first forwarding entry; and obtain the second packet based on a replicated first packet and the first reference information included in the first node information.

In a possible implementation, the sending module 703 is configured to send the second packet to the first intermediate node based on the next-hop information included in the first forwarding entry, where the next-hop information included in the first forwarding entry includes one or more of a port communicating with the first intermediate node and an address of the first intermediate node.

In a possible implementation, the second packet further includes second node information, the second node information includes a second bit string and second reference information, the second bit string indicates M next-hop devices of the first intermediate node, M is an integer greater than or equal to 1, and the second reference information is used for indexing third node information corresponding to a second intermediate node in the M next-hop devices; the second packet further includes second node information, the second node information includes a second bit string and second reference information, the second bit string indicates M next-hop devices of the first intermediate node, M is an integer greater than or equal to 1, and the second reference information indicates that the first intermediate node is a previous hop of an egress node; or the second packet further includes second node information, the second node information includes a second bit string and second reference information, the second bit string indicates M next-hop devices of the first intermediate node, M is an integer greater than or equal to 1, and the second reference information indicates to pop up the first node information and the second node information.

In a possible implementation, if N is 1, a value of the first identifier is a value carried in the first reference information; or if N is an integer greater than 1, a value of the first identifier is a value carried in the first reference information, or the value of the first identifier is a sum of the value carried in the first reference information and an offset.

In a possible implementation, the first obtaining module 701 is further configured to: obtain the bit position corresponding to the first intermediate node and the next-hop information corresponding to the first intermediate node; and obtain the first forwarding entry based on the bit position corresponding to the first intermediate node and the next-hop information corresponding to the first intermediate node; or the first obtaining module 701 is further configured to receive the first forwarding entry sent by a control device.

In a possible implementation, the first packet is an internet protocol version 6 IPv6 packet, the IPv6 packet includes a routing header RH, and the RH includes the first node information.

When the apparatus is used in a first intermediate node, the first obtaining module 701 is configured to receive a first packet, where the first packet includes a first identifier and first node information, the first identifier is used for indexing the first node information, the first node information includes a first bit string, the first bit string indicates M next-hop devices of the first intermediate node, and M is an integer greater than or equal to 1; the second obtaining module 702 is configured to obtain a second packet based on the first node information determined by using the first identifier; and the sending module 703 is configured to send the second packet to a next hop that is in the M next-hop devices and that is used for processing the second packet.

In a possible implementation, the next hop used for processing the second packet is a second intermediate node, the first packet further includes second node information and first reference information, the first reference information is used for indexing the second node information, and the second obtaining module 702 is configured to: obtain the first node information from the first packet based on the first identifier; obtain a first forwarding entry based on the first bit string included in the first node information, where the first forwarding entry includes a bit position and next-hop information, the bit position included in the first forwarding entry corresponds to a first bit in the first bit string, the first bit corresponds to the second intermediate node, and the next-hop information included in the first forwarding entry corresponds to the second intermediate node; replicate the first packet based on the first forwarding entry; and obtain the second packet based on a replicated first packet and the first reference information included in the first node information, where the second packet includes a second identifier, and the second identifier is a value determined based on the first reference information.

In a possible implementation, the sending module 703 is configured to send the second packet to the second intermediate node based on the next-hop information included in the first forwarding entry, where the next-hop information included in the first forwarding entry includes one or more of a port communicating with the second intermediate node and an address of the second intermediate node.

In a possible implementation, the next hop used for processing the second packet is an egress node, the first packet further includes first reference information, the first reference information indicates that the first intermediate node is a previous hop of the egress node, and the second obtaining module 702 is configured to: obtain the first node information from the first packet based on the first identifier; obtain a first forwarding entry based on the first bit string included in the first node information, where the first forwarding entry includes a bit position and next-hop information, the bit position included in the first forwarding entry corresponds to a first bit in the first bit string, the first bit corresponds to a second intermediate node, and the next-hop information included in the first forwarding entry corresponds to the second intermediate node; replicate the first packet based on the first forwarding entry; and obtain the second packet based on a replicated first packet and the first reference information included in the first node information.

In a possible implementation, the second packet includes a second identifier, and a value of the second identifier is a value determined based on the first reference information; or the second packet does not include the first node information or the first identifier.

In a possible implementation, the sending module 703 is configured to send the second packet to the egress node based on the next-hop information included in the first forwarding entry, where the next-hop information included in the first forwarding entry includes one or more of a port communicating with the egress node and an address of the egress node.

In a possible implementation, if M is 1, a value of the second identifier is a value carried in the first reference information; or if M is an integer greater than 1, a value of the second identifier of the second packet is a value carried in the first reference information, or the value of the second identifier of the second packet is a sum of the value carried in the first reference information and an offset.

In a possible implementation, the first obtaining module 701 is further configured to: obtain the bit position corresponding to the next hop used for processing the second packet and the next-hop information corresponding to the next hop used for processing the second packet; and obtain the first forwarding entry based on the bit position corresponding to the next hop used for processing the second packet and the next-hop information corresponding to the next hop used for processing the second packet; or the first obtaining module 701 is further configured to receive the first forwarding entry sent by a control device.

In a possible implementation, the first packet is an IPv6 packet, the IPv6 packet includes a routing header RH, and the RH includes the first identifier and the first node information.

It should be understood that, when the apparatus provided in FIG. 16 implements functions of the apparatus, division into the foregoing functional modules is merely used as an example for description. During an actual application, the foregoing functions may be allocated to different functional modules for implementation based on a requirement. In other words, an inner structure of a device is divided into different functional modules, to implement all or some of the functions described above. In addition, the apparatus provided in the foregoing embodiment and the method embodiments pertain to the same concept. For a specific implementation process of the apparatus, refer to the method embodiments. Details are not described herein again.

Figure 17:
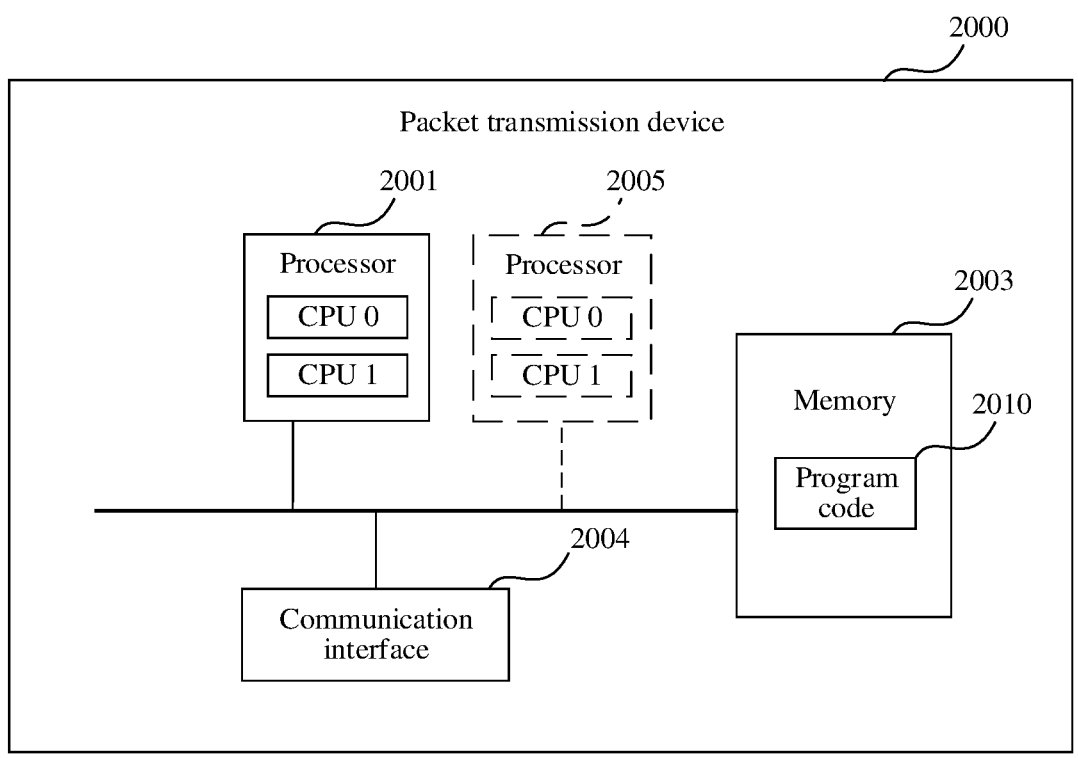
FIG. 17 is a schematic diagram of a structure of a packet transmission device according to an embodiment of this application.

FIG. 17 is a schematic diagram of a structure of a packet transmission device 2000 according to an example embodiment of this application. The packet transmission device 2000 shown in FIG. 17 may be configured to perform operations related to the ingress node or the intermediate node in the packet transmission method shown in FIG. 2 to FIG. 15. The packet transmission device 2000 is, for example, a switch or a router. The packet transmission device 2000 may be implemented by using a general bus architecture.

As shown in FIG. 17, the packet transmission device 2000 includes at least one processor 2001, a memory 2003, and at least one communication interface 2004.

The processor 2001 is, for example, a general-purpose central processing unit (CPU), a digital signal processor (DSP), a network processor (NP), a graphics processing unit (GPU), a neural network processing unit (NPU), a data processing unit (DPU), a microprocessor, or one or more integrated circuits configured to implement the solutions of this application. For example, the processor 2001 includes an application-specific integrated circuit (ASIC), a programmable logic device (PLD) or another programmable logic device, a transistor logic device, a hardware component, or any combination thereof. The PLD is, for example, a complex programmable logic device (CPLD), a field-programmable gate array (FPGA), generic array logic (GAL), or any combination thereof. The processor may implement or execute various logical blocks, modules, and circuits described with reference to content disclosed in embodiments of the present invention. The processor may alternatively be a combination of processors implementing a computing function, for example, a combination of one or more microprocessors, or a combination of a DSP and a microprocessor.

Optionally, the packet transmission device 2000 further includes a bus. The bus is configured to transmit information between the components of the packet transmission device 2000. The bus may be a peripheral component interconnect (PCI for short) bus, an extended industry standard architecture (EISA for short) bus, or the like. Buses may be classified into an address bus, a data bus, a control bus, and the like.

For ease of representation, only one thick line is used for representing the bus in FIG. 17, but this does not mean that there is only one bus or only one type of bus.

The memory 2003 is, for example, a read-only memory (ROM) or another type of static storage device that can store static information and instructions, or a random access memory (RAM) or another type of dynamic storage device that can store information and instructions, or an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used for carrying or storing expected program code in a form of instructions or a data structure and that can be accessed by a computer, but is not limited thereto. For example, the memory 2003 exists independently, and is connected to the processor 2001 through the bus. Alternatively, the memory 2003 may be integrated with the processor 2001.

The communication interface 2004 is configured to communicate with another device or a communication network by using any transceiver-type apparatus. The communication network may be an ethernet, a radio access network (RAN), a wireless local area network (WLAN), or the like. The communication interface 2004 may include a wired communication interface, and may further include a wireless communication interface. Specifically, the communication interface 2004 may be an ethernet interface, a fast ethernet (FE) interface, a gigabit ethernet (GE) interface, an asynchronous transfer mode (ATM) interface, a wireless local area network (WLAN) interface, a cellular network communication interface, or a combination thereof. The Ethernet interface may be an optical interface, an electrical interface, or a combination thereof. In this embodiment of this application, the communication interface 2004 may be used by the packet transmission device 2000 to communicate with another device.

During specific implementation, in an embodiment, the processor 2001 may include one or more CPUs, for example, a CPU 0 and a CPU 1 shown in FIG. 17. Each of the processors may be a single-core (single-CPU) processor, or may be a multi-core (multi-CPU) processor. Herein, the processor may be one or more devices, circuits, and/or processing cores configured to process data (for example, computer program instructions).

During specific implementation, in an embodiment, the packet transmission device 2000 may include a plurality of processors, such as the processor 2001 and a processor 2005 in FIG. 17. Each of the processors may be a single-core processor, or may be a multi-core processor. The processor herein may be one or more devices, circuits, and/or processing cores configured to process data (for example, computer program instructions).

During specific implementation, in an embodiment, the packet transmission device 2000 may further include an output device and an input device. The output device communicates with the processor 2001, and may display information in a plurality of manners. For example, the output device may be a liquid crystal display (LCD), a light emitting diode (LED) display device, a cathode ray tube (CRT) display device, or a projector. The input device communicates with the processor 2001, and may receive an input of a user in a plurality of manners. For example, the input device may be a mouse, a keyboard, a touchscreen device, or a sensing device.

In some embodiments, the memory 2003 is configured to store program code 2010 for performing the solutions of this application, and the processor 2001 may execute the program code 2010 stored in the memory 2003. To be specific, the packet transmission device 2000 may implement, by using the processor 2001 and the program code 2010 in the memory 2003, the packet transmission method provided in the method embodiments. The program code 2010 may include one or more software modules. Optionally, the processor 2001 may alternatively store program code or instructions for performing the solutions of this application.

In a specific embodiment, the packet transmission device 2000 in this embodiment of this application may correspond to the first device in the foregoing embodiments of the packet transmission method. The processor 2001 in the packet transmission device 2000 reads the instructions in the memory 2003, so that the packet transmission device 2000 shown in FIG. 17 can perform all or some operations performed by the first device.

Specifically, the processor 2001 is configured to send a second packet to a second device through the communication interface, where the second packet includes a second identifier, and the second identifier is used for indexing node information of the second device. For brevity, other optional implementations are not described herein again.

For another example, the packet transmission device 2000 in this embodiment of this application may correspond to the second device in the foregoing method embodiments. The processor 2001 in the packet transmission device 2000 reads the instructions in the memory 2003, so that the packet transmission device 2000 shown in FIG. 17 can perform all or some operations performed by the second device.

The packet transmission device 2000 may alternatively correspond to the packet transmission apparatus shown in FIG. 16. Each functional module in the packet transmission apparatus is implemented by using software of the packet transmission device 2000. In other words, the functional modules included in the packet transmission apparatus are generated after the processor 2001 of the packet transmission device 2000 reads the program code 2010 stored in the memory 2003.

The steps of the packet transmission method shown in FIG. 2 to FIG. 15 are completed by using an integrated logic circuit of hardware in the processor of the packet transmission device 2000 or instructions in a form of software. The steps of the method disclosed with reference to embodiments of this application may be directly performed by a hardware processor, or may be performed by a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and performs the steps in the foregoing method in combination with the hardware in the processor. To avoid repetition, details are not described herein again.

Figure 18:
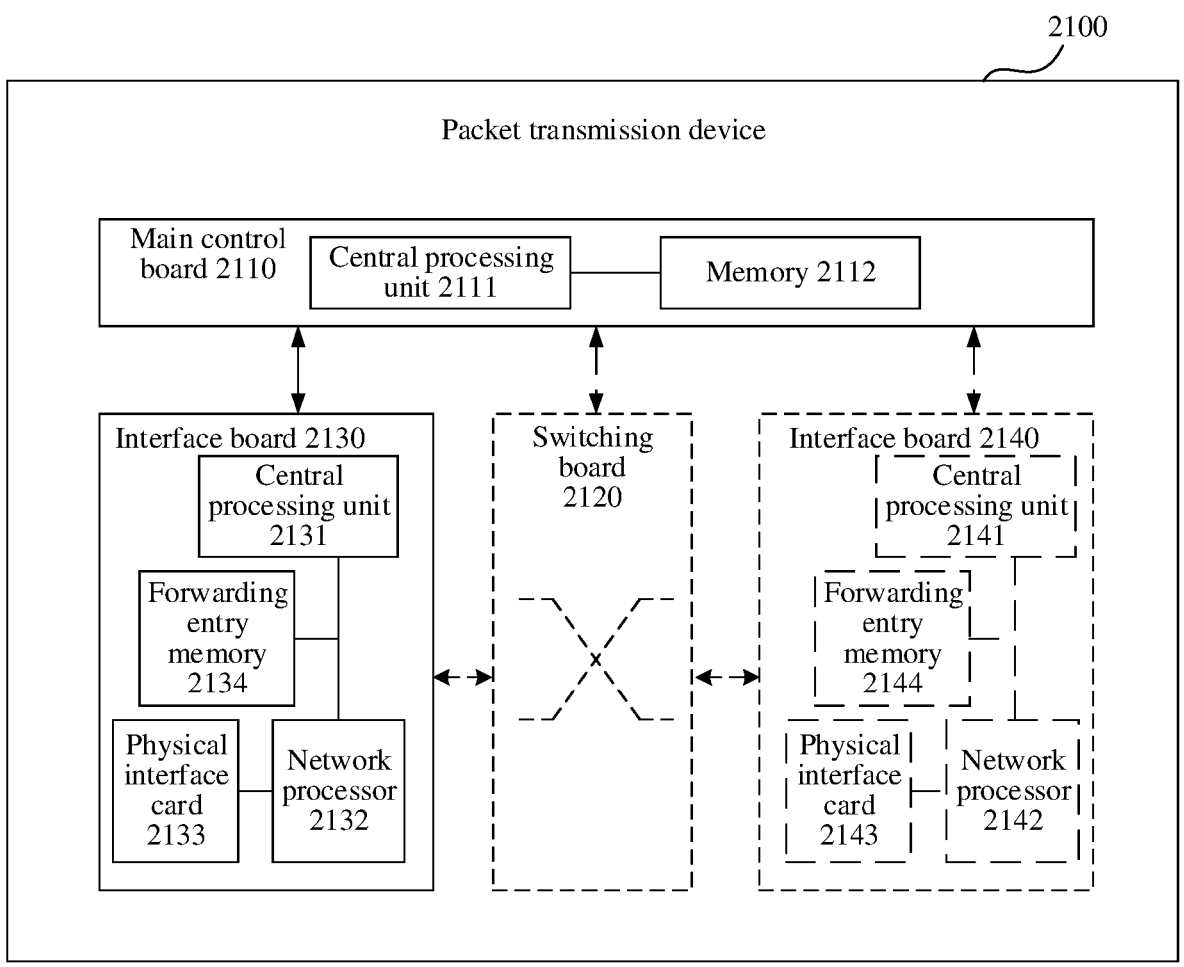
FIG. 18 is a schematic diagram of a structure of a packet transmission device according to an embodiment of this application.

FIG. 18 is a schematic diagram of a structure of a packet transmission device 2100 according to another example embodiment of this application. The packet transmission device 2100 shown in FIG. 18 is configured to perform all or some of the operations in the packet transmission method shown in FIG. 2 to FIG. 15. The packet transmission device 2100 is, for example, a switch or a router. The packet transmission device 2100 may be implemented by using a general bus architecture.

As shown in FIG. 18, the packet transmission device 2100 includes a main control board 2110 and an interface board 2130.

The main control board is also referred to as a main processing unit (MPU) or a route processor card. The main control board 2110 is configured to control and manage components in the packet transmission device 2100, including route computation, device management, device maintenance, and protocol processing functions. The main control board 2110 includes a central processing unit 2111 and a memory 2112.

The interface board 2130 is also referred to as a line processing unit (LPU), a line card, or a service board. The interface board 2130 is configured to provide various service interfaces, and forward a data packet. The service interfaces include but are not limited to an ethernet interface, a POS (packet over SONET/SDH) interface, and the like. The ethernet interface is, for example, a flexible ethernet service interface (FlexE Clients). The interface board 2130 includes a central processing unit 2131, a network processor 2132, a forwarding entry memory 2134, and a physical interface card (PIC) 2133.

The central processing unit 2131 on the interface board 2130 is configured to control and manage the interface board 2130 and communicate with the central processing unit 2111 on the main control board 2110.

The network processor 2132 is configured to implement packet forwarding processing. A form of the network processor 2132 may be a forwarding chip. The forwarding chip may be a network processor (NP). In some embodiments, the forwarding chip may be implemented by using an application-specific integrated circuit (ASIC) or a field programmable gate array (FPGA). Specifically, the network processor 2132 is configured to forward a received packet based on a forwarding table stored in the forwarding entry memory 2134. If a destination address field of the packet is an address of the network device 2100, the network processor 2132 sends the packet to an upper-layer device for processing by a CPU (for example, the central processing unit 2131). If a destination address field of the packet is not an address of the network device 2100, the network processor 2132 finds, based on the destination address field, a next hop and an outbound interface that correspond to the destination address field in the forwarding table, and forwards the packet to the outbound interface corresponding to the destination address field. Processing on an uplink packet may include: processing at a packet inbound interface and forwarding table lookup, and processing on a downlink packet may include: forwarding table lookup and the like. In some embodiments, the central processing unit may also perform a function of the forwarding chip, for example, implement software forwarding based on a general-purpose CPU, so that the interface board does not need the forwarding chip.

The physical interface card 2133 is configured to implement a physical layer interconnection function. Original traffic enters the interface board 2130 from the physical interface card 2133, and a processed packet is sent out from the physical interface card 2133. The physical interface card 2133 is also referred to as a subcard and may be installed on the interface board 2130, and is responsible for converting an optical/electrical signal into a packet, performing validity check on the packet, and then forwarding the packet to the network processor 2132 for processing. In some embodiments, the central processing unit 2131 may alternatively perform a function of the network processor 2132, for example, implement software forwarding based on a general-purpose CPU, so that the physical interface card 2133 does not need the network processor 2132.

Optionally, the packet transmission device 2100 includes a plurality of interface boards. For example, the packet transmission device 2100 further includes an interface board 2140, and the interface board 2140 includes a central processing unit 2141, a network processor 2142, a forwarding entry memory 2144, and a physical interface card 2143. Functions and implementations of components in the interface board 2140 are the same as or similar to those of the interface board 2130, and details are not described herein again.

Optionally, the packet transmission device 2100 further includes a switching board 2120. The switching board 2120 may also be referred to as a switch fabric unit (SFU). When the packet transmission device has a plurality of interface boards, the switching board 2120 is configured to complete data exchange between the interface boards. For example, the interface board 2130 and the interface board 2140 may communicate with each other via the switching board 2120.

The main control board 2110 is coupled to the interface board. For example, the main control board 2110, the interface board 2130, the interface board 2140, and the switching board 2120 are connected to a system backboard through a system bus for interworking. In a possible implementation, inter-process communication (IPC) channels are established between the main control board 2110 and the interface board 2130 and between the main control board 2110 and the interface board 2140, and communication between the main control board 2110 and the interface board 2130 and between the main control board 2110 and the interface board 2140 is performed through the IPC channels.

Logically, the packet transmission device 2100 includes a control plane and a forwarding plane. The control plane includes the main control board 2110 and the central processing unit 2111. The forwarding plane includes components used for forwarding, for example, the forwarding entry memory 2134, the physical interface card 2133, and the network processor 2132. The control plane performs the following functions: a function of a router, generating a forwarding table, processing signaling and a protocol packet, configuring and maintaining a network device status, and the like. The control plane delivers the generated forwarding table to the forwarding plane. On the forwarding plane, the network processor 2132 searches the forwarding table delivered by the control plane, and then forwards, based on the table, a packet received by the physical interface card 2133. The forwarding table delivered by the control plane may be stored in the forwarding entry memory 2134. In some embodiments, the control plane and the forwarding plane may be totally separated, and are not on a same network device.

It should be noted that, there may be one or more main control boards. When there are a plurality of main control boards, the main control boards may include an active main control board and a standby main control board. There may be one or more interface boards, and a packet transmission device with a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, a packet transmission device may need no switching board, and an interface board implements a service data processing function of an entire system. In a distributed forwarding architecture, a packet transmission device may have at least one switching board, and exchange data between a plurality of interface boards through the switching board, to provide a large-capacity data exchange and processing capability. Therefore, a data access and processing capability of the packet transmission device in the distributed architecture is greater than that of the packet transmission device in the centralized architecture. Optionally, the packet transmission device may alternatively be in a form in which there is only one card. To be specific, there is no switching board, and functions of the interface board and the main control board are integrated on the card. In this case, the central processing unit on the interface board and the central processing unit on the main control board may be combined to form one central processing unit on the card, to perform functions obtained by combining the two central processing units. This form of packet transmission device (for example, a network device such as a low-end switch or a router) has a weak data exchange and processing capability. A specific architecture that is to be used depends on a specific networking deployment scenario. This is not limited herein.

In a specific embodiment, the packet transmission device 2100 corresponds to the packet transmission apparatus that is used in the ingress node or the first intermediate node and that is shown in FIG. 16. In some embodiments, the first obtaining module 701 and the sending module 703 in the packet transmission apparatus shown in FIG. 16 are equivalent to the physical interface card 2133 in the packet transmission device 2100, and the second obtaining module 702 is equivalent to the central processing unit 2111 or the network processor 2132 in the packet transmission device 2100.

Based on the packet transmission devices shown in FIG. 17 and FIG. 18, an embodiment of this application further provides a packet transmission system. The system includes a first device and a second device. Optionally, the first device is the packet transmission device 2000 shown in FIG. 17 or the packet transmission device 2100 shown in FIG. 18, and the second device is the packet transmission device 2000 shown in FIG. 17 or the packet transmission device 2100 shown in FIG. 18.

For a packet transmission method performed by the first device and the second device, refer to the related descriptions of the first device and the second device in the embodiments shown in FIG. 2 to FIG. 15. Details are not described herein again.

An embodiment of this application further provides a communication apparatus. The apparatus includes a transceiver, a memory, and a processor. The transceiver, the memory, and the processor communicate with each other through an internal connection path. The memory is configured to store instructions. The processor is configured to execute the instructions stored in the memory, to control the transceiver to receive a signal and control the transceiver to send a signal. In addition, when the processor executes the instructions stored in the memory, the processor is enabled to perform the packet transmission method that needs to be performed by the first device.

An embodiment of this application further provides a communication apparatus. The apparatus includes a transceiver, a memory, and a processor. The transceiver, the memory, and the processor communicate with each other through an internal connection path. The memory is configured to store instructions. The processor is configured to execute the instructions stored in the memory, to control the transceiver to receive a signal and control the transceiver to send a signal. In addition, when the processor executes the instructions stored in the memory, the processor is enabled to perform the packet transmission method that needs to be performed by the second device.

It should be understood that the processor may be a central processing unit (CPU), or may be another general-purpose processor, a digital signal processor (DSP), an application specific integrated circuit (ASIC), a field-programmable gate array (FPGA) or another programmable logic device, a discrete gate or a transistor logic device, a discrete hardware component, or the like. The general-purpose processor may be a microprocessor, any conventional processor, or the like. It should be noted that the processor may be a processor that supports an advanced reduced instruction set computing machines (ARM) architecture.

Further, in an optional embodiment, the memory may include a read-only memory and a random access memory, and provide instructions and data for the processor. The memory may further include a nonvolatile random access memory. For example, the memory may further store information of a device type.

The memory may be a volatile memory or a nonvolatile memory, or may include both a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (random access memory, RAM), used as an external cache. By way of example, and not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

An embodiment of this application further provides a computer-readable storage medium. The storage medium stores at least one instruction, and the instruction is loaded and executed by a processor, to implement any one of the foregoing packet transmission methods.

An embodiment of this application further provides a computer program (product). When the computer program is executed by a computer, a processor or the computer may perform the steps and/or procedures of the corresponding packet transmission method in the foregoing method embodiments.

An embodiment of this application further provides a chip, including a processor, configured to invoke, from a memory, instructions stored in the memory and run the instructions, to enable a communication device on which the chip is installed to perform the packet transmission method in the foregoing aspects.

An embodiment of this application further provides another chip, including an input interface, an output interface, a processor, and a memory. The input interface, the output interface, the processor, and the memory are connected through an internal connection path. The processor is configured to execute code in the memory. When the code is executed, the processor is configured to perform the packet transmission method in the foregoing aspects.

All or some of the foregoing embodiments may be implemented by using software, hardware, firmware, or any combination thereof. When software is used for implementing the embodiments, all or some of the embodiments may be implemented in a form of a computer program product. The computer program product includes one or more computer instructions. When the computer program instructions are loaded and executed on the computer, the procedure or functions according to this application are all or partially generated. The computer may be a general-purpose computer, a special-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive, solid-state drive), or the like.

A person of ordinary skill in the art may be aware that, with reference to the embodiments disclosed in this specification, the method steps and the modules can be implemented by using software, hardware, firmware, or any combination thereof. To clearly describe the interchangeability between the hardware and the software, the steps and composition of each embodiment have generally described above based on functions. Whether the functions are performed by the hardware or the software depends on particular applications and design constraints of the technical solutions. A person of ordinary skill in the art may use different methods to implement the described functions for each particular application, but it should not be considered that the implementation goes beyond the scope of this application.

A person of ordinary skill in the art may understand that all or some of the steps of embodiments may be implemented by hardware or a program instructing related hardware. The program may be stored in a computer-readable storage medium. The storage medium may include: a read-only memory, a magnetic disk, or an optical disc.

When the software is used for implementing the embodiments, all or some of the embodiments may be implemented in a form of a computer program product. The computer program product includes one or more computer program instructions. For example, the method in embodiments of this application may be described in a context of a machine-executable instruction. The machine-executable instruction is included in, for example, a program module executed in a device on a real or virtual processor of a target. Usually, the program module includes a routine, a program, a library, an object, a class, a component, a data structure, and the like, and executes a specific task or implements a specific abstract data structure. In various embodiments, functions of program modules may be combined or split between the described program modules. The machine-executable instruction for the program module may be executed locally or within a distributed device. In the distributed device, the program module may be located in both a local storage medium and a remote storage medium.

Computer program code used for implementing the method in embodiments of this application may be written in one or more programming languages. The computer program code may be provided for a processor of a general-purpose computer, a dedicated computer, or another programmable data processing apparatus, so that when the program code is executed by the computer or the another programmable data processing apparatus, functions/operations specified in the flowcharts and/or block diagrams are implemented. The program code may be executed all on a computer, partially on a computer, as an independent software package, partially on a computer and partially on a remote computer, or all on a remote computer or server.

In a context of embodiments of this application, the computer program code or related data may be carried by any appropriate carrier, so that a device, an apparatus, or a processor can perform various processing and operations described above. For example, the carrier includes a signal, a computer-readable medium, and the like.

For example, the signal may include propagating signals in electrical, optical, radio, sound, or other forms, such as carrier waves and infrared signals.

The machine-readable medium may be any tangible medium that includes or stores a program used for or related to an instruction execution system, apparatus, or device. The machine-readable medium may be a machine-readable signal medium or a machine-readable storage medium. The machine-readable medium may include but is not limited to an electronic, magnetic, optical, electromagnetic, infrared, or semiconductor system, apparatus, or device, or any appropriate combination thereof. More detailed examples of the machine-readable storage medium include an electrical connection with one or more wires, a portable computer disk, a hard disk, a random access memory (RAM), a read-only memory (ROM), an erasable programmable read-only memory (EPROM or flash memory), an optical storage device, a magnetic storage device, or any appropriate combination thereof.

It may be clearly understood by a person skilled in the art that, for convenient and brief description, for a detailed working process of the foregoing system, device, and module, refer to a corresponding process in the foregoing method embodiments. Details are not described herein.

In the several embodiments provided in this application, it should be understood that the disclosed system, device, and method may be implemented in other manners. For example, the described device embodiment is merely an example. For example, the module division is merely logical function division and may be other division during actual implementation. For example, a plurality of modules or components may be combined or integrated into another system, or some features may be omitted or not performed. In addition, the displayed or discussed mutual couplings or direct couplings or communication connections may be implemented through some interfaces, and the indirect couplings or communication connections between the devices or modules may be electrical connections, mechanical connections, or connections in other forms.

The modules described as separate parts may or may not be physically separate, and parts displayed as modules may or may not be physical modules, may be located in one position, or may be distributed on a plurality of network modules. Some or all of the modules may be selected based on actual requirements to achieve the objectives of the solutions in embodiments of this application.

In addition, functional modules in embodiments of this application may be integrated into one processing module, or each of the modules may exist alone physically, or two or more modules may be integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of this application essentially, or the part contributing to the related art, or all or some of the technical solutions may be implemented in the form of a software product. The computer software product is stored in a storage medium and includes several instructions to cause a computer device (which may be a personal computer, a server, a network device, or the like) to perform all or some of the steps of the method in embodiments of this application. The foregoing storage medium includes any medium that can store program code, such as a USB flash drive, a removable hard disk, a read-only memory (ROM), a random access memory (RAM), a magnetic disk, or an optical disc.

In this application, the terms "first", "second", and the like are used for distinguishing between same or similar items whose effects and functions are basically the same. It should be understood that there is no logical or time-sequence dependency among "first", "second", and "nth", and a quantity and an execution sequence are not limited. It should also be understood that although the terms such as "first" and "second" are used in the following description to describe various elements, these elements should not be limited by the terms. These terms are merely used for distinguishing one element from another element. For example, without departing from the scope of the various examples, a first image may be referred to as a second image, and similarly, a second image may be referred to as a first image. Both the first image and the second image may be images, and in some cases, may be separate and different images.

It should be further understood that sequence numbers of processes do not mean execution sequences in embodiments of this application. The execution sequences of the processes should be determined based on functions and internal logic of the processes, and should not be construed as any limitation on the implementation processes of embodiments of this application.

In this application, the term "at least one" means one or more, and the term "a plurality of" in this application means two or more. For example, "a plurality of second packets" means "two or more second packets". The terms "system" and "network" may be used interchangeably in this specification.

It should be understood that the terms used in the descriptions of various examples in this specification are merely intended to describe specific examples, but are not intended to constitute a limitation. The terms "one" ("a" and "an") and "the" of singular forms used in the descriptions of various examples and the appended claims are also intended to include plural forms, unless otherwise specified in the context clearly.

It should be further understood that, the term "and/or" used in this specification indicates and includes any or all possible combinations of one or more items in associated listed items. The term "and/or" describes an association relationship between associated objects and represents that three relationships may exist. For example, A and/or B may represent the following three cases: Only A exists, both A and B exist, and only B exists. In addition, the character "/" in this application generally indicates an "or" relationship between associated objects.

It should be further understood that the term "include" (or referred to as "includes", "including", "comprises", and/or "comprising"), when being used in this specification, specifies the presence of stated features, integers, steps, operations, elements, and/or components, but do not preclude presence or addition of one or more other features, integers, steps, operations, elements, components, and/or groups thereof.

It should be further understood that the term "if" may be interpreted as a meaning "when" ("upon"), "in response to determining", or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

It should be understood that determining B based on A does not mean that B is determined only based on A, but B may be determined based on A and/or other information.

It should further be understood that "one embodiment", "an embodiment", or "a possible implementation" mentioned throughout this specification means that particular features, structures, or characteristics related to the embodiments or implementations are included in at least one embodiment of this application. Therefore, "in one embodiment", "in an embodiment", or "in a possible implementation" appearing throughout this specification does not necessarily mean a same embodiment. In addition, these particular features, structures, or characteristics may be combined in one or more embodiments by using any appropriate manner.

The foregoing descriptions are merely optional embodiments of this application, but are not intended to limit this application. Any modification, equivalent replacement, or improvement made without departing from the spirit and principle of this application shall fall within the protection scope of this application.

What is claimed is:

1. A packet transmission method, wherein the method comprises:
    obtaining, by an ingress node, a first packet, wherein the first packet comprises first node information, the first node information comprises a first bit string and first reference information, the first bit string indicates N next-hop devices of the ingress node, N is an integer greater than or equal to 1, and the first reference information is used for indexing second node information corresponding to a first intermediate node in the N next-hop devices;
    obtaining, by the ingress node, a second packet based on the first node information, wherein the second packet comprises a first identifier determined based on the first reference information; and
    sending, by the ingress node, the second packet to the first intermediate node.

2. The method according to claim 1, wherein the obtaining, by the ingress node, a second packet based on the first node information comprises:
    obtaining, by the ingress node, a first forwarding entry based on the first bit string comprised in the first node information, wherein the first forwarding entry comprises a bit position and next-hop information, the bit position comprised in the first forwarding entry corresponds to a first bit in the first bit string, the first bit corresponds to the first intermediate node, and the next-hop information comprised in the first forwarding entry corresponds to the first intermediate node;
    replicating, by the ingress node, the first packet based on the first forwarding entry; and
    obtaining, by the ingress node, the second packet based on a replicated first packet and the first reference information comprised in the first node information.

3. The method according to claim 2, wherein the sending, by the ingress node, the second packet to the first intermediate node comprises:
    sending, by the ingress node, the second packet to the first intermediate node based on the next-hop information comprised in the first forwarding entry, wherein the next-hop information comprised in the first forwarding entry comprises one or more of a port communicating with the first intermediate node and an address of the first intermediate node.

4. The method according to claim 1, wherein the second packet further comprises second node information, the second node information comprises a second bit string and second reference information, the second bit string indicates M next-hop devices of the first intermediate node, M is an integer greater than or equal to 1, and the second reference information is used for indexing third node information corresponding to a second intermediate node in the M next-hop devices; or
    the second packet further comprises second node information, the second node information comprises a second bit string and second reference information, the second bit string indicates M next-hop devices of the first intermediate node, M is an integer greater than or equal to 1, and the second reference information indicates that the first intermediate node is a previous hop of an egress node; or
    the second packet further comprises second node information, the second node information comprises a second bit string and second reference information, the second bit string indicates M next-hop devices of the first intermediate node, M is an integer greater than or equal to 1, and the second reference information indicates to pop up the first node information and the second node information.

5. The method according to claim 1, wherein if N is 1, a value of the first identifier is a value carried in the first reference information; or if N is an integer greater than 1, a value of the first identifier is a value carried in the first reference information, or the value of the first identifier is a sum of the value carried in the first reference information and an offset.

6. The method according to claim 2, wherein the method further comprises:
    obtaining, by the ingress node, the bit position corresponding to the first intermediate node and the next-hop information corresponding to the first intermediate node; and
    obtaining, by the ingress node, the first forwarding entry based on the bit position corresponding to the first intermediate node and the next-hop information corresponding to the first intermediate node; or
    the method further comprises:
    receiving, by the ingress node, the first forwarding entry sent by a control device.

7. The method according to claim 1, wherein the first packet is an internet protocol version 6 IPv6 packet, the IPv6 packet comprises a routing header RH, and the RH comprises the first node information.

8. A packet transmission apparatus, wherein the apparatus is used in an ingress node, and the apparatus comprises:
a memory storing instructions; and
a processor coupled to the memory to execute the instructions to:
obtain a first packet, wherein the first packet comprises first node information, the first node information comprises a first bit string and first reference information, the first bit string indicates N next-hop devices of the ingress node, N is an integer greater than or equal to 1, and the first reference information is used for indexing second node information corresponding to a first intermediate node in the N next-hop devices;
obtain a second packet based on the first node information, wherein the second packet comprises a first identifier determined based on the first reference information; and
send the second packet to the first intermediate node.

9. The apparatus according to claim 8, wherein the processor coupled to the memory to execute the instructions to:
obtain a first forwarding entry based on the first bit string comprised in the first node information, wherein the first forwarding entry comprises a bit position and next-hop information, the bit position comprised in the first forwarding entry corresponds to a first bit in the first bit string, the first bit corresponds to the first intermediate node, and the next-hop information comprised in the first forwarding entry corresponds to the first intermediate node; replicate the first packet based on the first forwarding entry; and obtain the second packet based on a replicated first packet and the first reference information comprised in the first node information.

10. The apparatus according to claim 9, wherein the processor coupled to the memory to execute the instructions to:
send the second packet to the first intermediate node based on the next-hop information comprised in the first forwarding entry, wherein the next-hop information comprised in the first forwarding entry comprises one or more of a port communicating with the first intermediate node and an address of the first intermediate node.

11. The apparatus according to claim 8, wherein the second packet further comprises second node information, the second node information comprises a second bit string and second reference information, the second bit string indicates M next-hop devices of the first intermediate node, M is an integer greater than or equal to 1, and the second reference information is used for indexing third node information corresponding to a second intermediate node in the M next-hop devices;
the second packet further comprises second node information, the second node information comprises a second bit string and second reference information, the second bit string indicates M next-hop devices of the first intermediate node, M is an integer greater than or equal to 1, and the second reference information indicates that the first intermediate node is a previous hop of an egress node; or
the second packet further comprises second node information, the second node information comprises a second bit string and second reference information, the second bit string indicates M next-hop devices of the first intermediate node, M is an integer greater than or equal to 1, and the second reference information indicates to pop up the first node information and the second node information.

12. The apparatus according to claim 8, wherein if N is 1, a value of the first identifier is a value carried in the first reference information; or if N is an integer greater than 1, a value of the first identifier is a value carried in the first reference information, or the value of the first identifier is a sum of the value carried in the first reference information and an offset.

13. The apparatus according to claim 9, wherein the processor coupled to the memory to further execute the instructions to:
obtain the bit position corresponding to the first intermediate node and the next-hop information corresponding to the first intermediate node; and obtain the first forwarding entry based on the bit position corresponding to the first intermediate node and the next-hop information corresponding to the first intermediate node; or receive the first forwarding entry sent by a control device.

14. The apparatus according to claim 8, wherein the first packet is an internet protocol version 6 IPv6 packet, the IPv6 packet comprises a routing header RH, and the RH comprises the first node information.

15. A packet transmission apparatus, wherein the apparatus is used in a first intermediate node, and the apparatus comprises:
a memory storing instructions; and
a processor coupled to the memory to execute the instructions to:
receive a first packet, wherein the first packet comprises a first identifier and first node information, the first identifier is used for indexing the first node information, the first node information comprises a first bit string, the first bit string indicates M next-hop devices of the first intermediate node, and M is an integer greater than or equal to 1;
obtain a second packet based on the first node information determined by using the first identifier; and
send the second packet to a next hop that is in the M next-hop devices and that is used for processing the second packet.

16. The apparatus according to claim 15, wherein the next hop used for processing the second packet is a second intermediate node, the first packet further comprises second node information and first reference information, the first reference information is used for indexing the second node information, and the processor coupled to the memory to execute the instructions to: obtain the first node information from the first packet based on the first identifier; obtain a first forwarding entry based on the first bit string comprised in the first node information, wherein the first forwarding entry comprises a bit position and next-hop information, the bit position comprised in the first forwarding entry corresponds to a first bit in the first bit string, the first bit corresponds to the second intermediate node, and the next-hop information comprised in the first forwarding entry corresponds to the second intermediate node; replicate the first packet based on the first forwarding entry; and obtain the second packet based on a replicated first packet and the first reference information comprised in the first node information, wherein the second packet comprises a second identifier, and the second identifier is a value determined based on the first reference information.

17. The apparatus according to claim 16, wherein the processor coupled to the memory to execute the instructions to:

send the second packet to the second intermediate node based on the next-hop information comprised in the first forwarding entry, wherein the next-hop information comprised in the first forwarding entry comprises one or more of a port communicating with the second intermediate node and an address of the second intermediate node.

18. The apparatus according to claim 15, wherein the next hop used for processing the second packet is an egress node, the first packet further comprises first reference information, the first reference information indicates that the first intermediate node is a previous hop of the egress node, and the processor coupled to the memory to execute the instructions to: obtain the first node information from the first packet based on the first identifier; obtain a first forwarding entry based on the first bit string comprised in the first node information, wherein the first forwarding entry comprises a bit position and next-hop information, the bit position comprised in the first forwarding entry corresponds to a first bit in the first bit string, the first bit corresponds to a second intermediate node, and the next-hop information comprised in the first forwarding entry corresponds to the second intermediate node; replicate the first packet based on the first forwarding entry; and obtain the second packet based on a replicated first packet and the first reference information comprised in the first node information.

19. The apparatus according to claim 18, wherein the second packet comprises a second identifier, and a value of the second identifier is a value of the first reference information; or the second packet does not comprise the first node information or the first identifier.

20. The apparatus according to claim 18, wherein the processor coupled to the memory to execute the instructions to:

send the second packet to the egress node based on the next-hop information comprised in the first forwarding entry, wherein the next-hop information comprised in the first forwarding entry comprises one or more of a port communicating with the egress node and an address of the egress node.

* * * * *

UNITED STATES PATENT AND TRADEMARK OFFICE
CERTIFICATE OF CORRECTION

| | | |
|---|---|---|
| PATENT NO. | : 12,160,361 B2 | Page 1 of 1 |
| APPLICATION NO. | : 18/495897 | |
| DATED | : December 3, 2024 | |
| INVENTOR(S) | : Xuesong Geng | |

It is certified that error appears in the above-identified patent and that said Letters Patent is hereby corrected as shown below:

In the Specification

Column 18, Line 60, change "(TANA)" to --(IANA)--.

Signed and Sealed this
Thirty-first Day of December, 2024

Derrick Brent
*Acting Director of the United States Patent and Trademark Office*